(12) United States Patent
Li et al.

(10) Patent No.: US 9,654,308 B2
(45) Date of Patent: May 16, 2017

(54) SYSTEMS AND METHODS FOR CARRIER FREQUENCY OFFSET ESTIMATION FOR LONG TRAINING FIELDS

(71) Applicant: Intel Corporation, Santa Clara, CA (US)

(72) Inventors: Qinghua Li, San Ramon, CA (US); Xiaogang Chen, Beijing (CN); Yuan Zhu, Beijing (CN); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/752,050

(22) Filed: Jun. 26, 2015

(65) Prior Publication Data

US 2016/0142227 A1 May 19, 2016

Related U.S. Application Data

(60) Provisional application No. 62/082,021, filed on Nov. 19, 2014.

(51) Int. Cl.
*H04K 1/10* (2006.01)
*G06K 9/46* (2006.01)
(Continued)

(52) U.S. Cl.
CPC ...... *H04L 25/0226* (2013.01); *H04L 27/0014* (2013.01); *H04L 27/2675* (2013.01); *H04L 5/0016* (2013.01); *H04L 27/34* (2013.01)

(58) Field of Classification Search
CPC . H04L 5/0048; H04L 25/0204; H04L 5/0053; H04L 5/0035; H04L 1/0026;
(Continued)

(56) References Cited

U.S. PATENT DOCUMENTS 3,651,461 A * 3/1972 Holt .......................... G06K 9/18
382/204
7,026,121 B1 * 4/2006 Wohlgemuth ....... C12Q 1/6883
435/6.1
(Continued)

FOREIGN PATENT DOCUMENTS

EP 2600536 A2 6/2013

OTHER PUBLICATIONS

International Search Report and Written Opinion received for Patent Application No. PCT/US15/54596, mailed Jan. 22, 2016, 15 pages.

*Primary Examiner* — Daniel Washburn
*Assistant Examiner* — Sarah Hassan
(74) *Attorney, Agent, or Firm* — Eversheds-Sutherland (US) LLP

(57) ABSTRACT

This disclosure describes systems, and methods related to determining carrier frequency offset of a wireless communication channel based on a determined phase difference. In some embodiments, an access point is caused to receive one or more streams comprising one or more encoded long training field (LTF) symbols over the wireless communication channel from one or more user devices. The access point then determines a first phase of the wireless communication channel upon receipt of a first LTF symbol, and determines a second phase of the wireless communication channel upon receipt of a second LTF symbol. The access point next determines a phase difference between the first phase and the second phase. Based on the determined phase difference, the access point determines a carrier frequency offset of the wireless communication channel. Lastly, the access point modifies the wireless communication channel based at least in part on the determined CFO.

30 Claims, 16 Drawing Sheets

(51) Int. Cl.
*H04L 25/02* (2006.01)
*H04L 27/26* (2006.01)
*H04L 27/00* (2006.01)
*H04L 5/00* (2006.01)
*H04L 27/34* (2006.01)

(58) Field of Classification Search
CPC ............... H04L 27/2602; H04L 5/0016; H04L 25/0202; H04L 1/0618
USPC .......................................... 375/260; 382/204
See application file for complete search history.

(56) References Cited

U.S. PATENT DOCUMENTS

| | | | |
|---|---|---|---|
| 8,207,316 B1* | 6/2012 | Bentwich | C07K 14/005 435/375 |
| 8,379,763 B2* | 2/2013 | Sawai | H04L 25/0204 375/260 |
| 8,867,675 B1 | 10/2014 | Zhang | |
| 2002/0065217 A1* | 5/2002 | Qian | A61K 35/14 435/6.11 |
| 2007/0053435 A1* | 3/2007 | Kirenko | H04N 19/63 375/240.19 |
| 2010/0290449 A1* | 11/2010 | van Nee | H04B 7/0452 370/338 |
| 2011/0170627 A1* | 7/2011 | Kwon | H04L 25/0204 375/295 |
| 2011/0194655 A1 | 8/2011 | Sampath et al. | |
| 2011/0255488 A1* | 10/2011 | Lee | H04L 5/0048 370/329 |
| 2012/0189085 A1 | 7/2012 | Shi | |
| 2013/0116166 A1* | 5/2013 | Desai | C12Q 1/6883 514/1.1 |
| 2014/0171056 A1* | 6/2014 | Jafarian | H04W 52/0216 455/418 |

* cited by examiner

SYSTEMS AND METHODS FOR CARRIER FREQUENCY OFFSET ESTIMATION FOR LONG TRAINING FIELDS

CROSS REFERENCE TO RELATED APPLICATIONS

This United States Non-Provisional patent application claims priority to U.S. Provisional Patent Application No. 62/082,021 filed on Nov. 19, 2014 and entitled "SYSTEMS AND METHODS FOR CARRIER FREQUENCY OFFSET ESTIMATION FOR LONG TRAINING FIELDS," the entire contents of which are hereby incorporated by reference for all purposes.

TECHNICAL FIELD

This disclosure generally relates to systems and methods for wireless communications and, more particularly, to estimating carrier frequency offset for long training fields in a wireless communication network.

BACKGROUND

WiFi network performance is an important factor in environments with high numbers of users, such as hotspots in public venues. Efficient use of available spectrum and better management of interferences in a WiFi environment may improve WiFi performance. In order to address the issue of increasing bandwidth requirements that are demanded for wireless communications systems, different schemes may be employed to allow multiple user devices to communicate with a single access point by sharing the channel resources while achieving high data throughputs. Multiple Input or Multiple Output (MIMO) technology represents one such scheme that has emerged for wireless communication systems. MIMO technology has been adopted in several emerging wireless communications standards such as the Institute of Electrical and Electronics Engineers (IEEE) 802.11 standard.

DETAILED DESCRIPTION

Figure 1A:
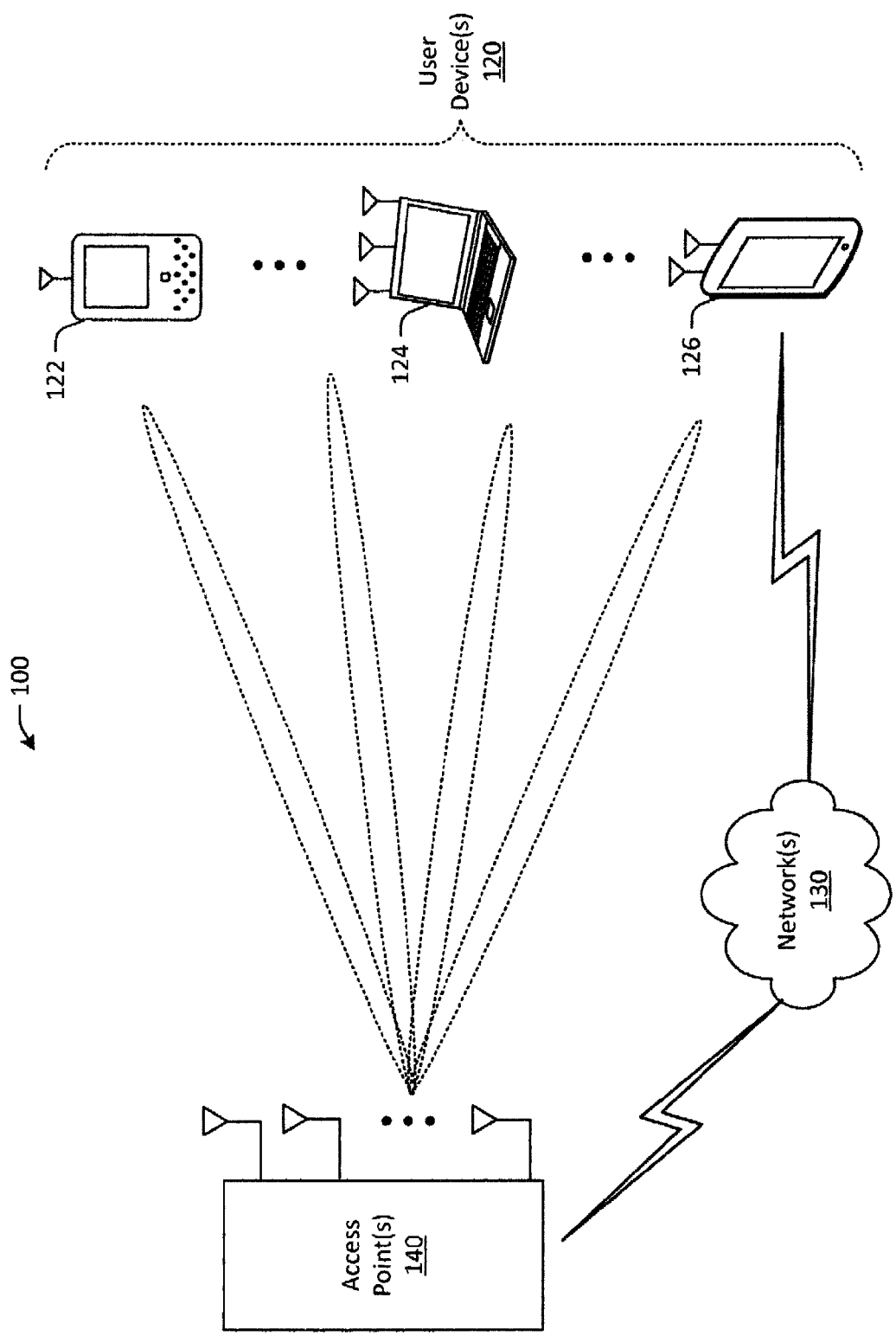
FIG. 1A depicts an illustrative example of data flow between components of an illustrative wireless communication system, in accordance with one or more embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, access terminal, or other personal communication system (PCS) device. The device may be either mobile or stationary.

One or more example embodiments discussed herein relate to systems, methods, and devices for estimating carrier frequency offset for long training fields in a wireless communication network. Although the present disclosure generally relates to WiFi networks, including the family of IEEE 802.11 standards (e.g., IEEE 802.11ax), other wireless networks and protocols may be employ the techniques disclosed herein.

In a wireless connection between an access point and a user device, a direction of data from the access point to the user device may be referred to as downlink direction. Conversely, an uplink connection may be used to send data from the user device back to the access point. Typically, when the access point establishes communication with one or more user devices, the access point may communicate in the downlink direction by sending data packets to the one or more user devices. The data packets may be preceded by one or more preambles that may be part of one or more headers. These preambles may be read by the one or more user devices and used to allow the one or more user devices to detect incoming data packets from the access point. In some embodiments, the preambles may be a signal, an identifier, and/or the like used in network communications to synchronize transmission timing between two or more devices (e.g., between the access points and the user device). The length of each preamble may affect the time required to transmit data between devices, which in turn may increase data packet overhead.

In some embodiments, channel or stream training may be needed to allow a receiver of the data packets (e.g., a user device) to properly synchronize with the transmitter of the data packets (e.g., an access point). For example, in the downlink direction from the access point to user device, the access point may transmit a channel training symbol or a training field that may be used to train (e.g., synchronize) the user device with the access point to accurately and consistently send and receive data to and from the access point.

Multi-user multiple-input multiple-output antenna system (MU-MIMO) may provide an enhancement for the IEEE 802.11 family of standards. With MU-MIMO, multiple user devices may be served at the same time by one or more access points. Some of the IEEE 802.11 standards (e.g., IEEE 802.11ax) may use OFDMA to boost the amount of data the router may transmit. Like OFDM (orthogonal frequency-division multiplexing), OFDMA encodes data on multiple sub-carrier frequencies—essentially packing more data into the same amount of air space. It is understood that OFDMA is a multi-user version of OFDM digital modulation scheme. Multiple access is achieved in OFDMA by assigning subsets of subcarriers to individual users, which may allow simultaneous data rate transmission from several users. For example, multiple access method may allow several user devices that may be connected to the same access point to transmit over it and to share its capacity.

Beamforming or spatial filtering is a signal processing technique used in sensor arrays for directional signal transmission or reception. Beamforming may be used at both the transmitting and receiving ends of a user device and/or an access point in order to achieve spatial selectivity. It is understood that beamforming may be used for radio or sound waves. Beamforming may be found in applications such as radar, sonar, seismology, wireless communications, radio astronomy, acoustics, and biomedicine.

In some embodiments, crosstalk between different communications channels (e.g., signal distortion) may be mitigated by transmitting additional training fields that may exist between communication channels.

In some instances, a receiver, such as an access point, may transmit a trigger frame (e.g., a data packet, a training field, a channel training symbol, and/or the like) to one or more user devices (e.g., wireless stations, computing devices, and/or the like). The trigger frame may be sent periodically and/or continuously and may include scheduling information for frequency, subband, and/or spatial stream designations for respective user devices in communication with the access point. In some embodiments, each user device may be designated a particular frequency and/or subband for communication with the access point. Alternatively, each user device may be designated a frequency and/or subband that is dynamic and therefore may change depending on particular conditions (e.g., current traffic, measured distortion, predicted traffic, and/or the like). The user devices may use information provided in the trigger frame (or in a header of the trigger frame) to synchronize with the access point. In some instances, there may be error, for example 200 Hz, between frequency of the user device and the access point. Alternatively and/or in combination, there may be errors in phase and/or time differences of signals being transmitted between the user device and the access point. As the error increases, the access point may be unable to differentiate data received from different user devices, because the access point may receive multiple streams of data. Therefore, various embodiments of the invention may be directed toward efforts to reducing error and therefore more closely align channel characteristics of each user device and/or the access point so as to allow for more accurate and consistent communication between each user device and the access point.

Communication between each user device and the access point typically occurs over one or more channels (e.g., streams of data). In downlink communication, streams comprising sequences of long training field (LTF) symbols may be transmitted from an access point to one or more user devices for channel training of communication channels between the access point and each user device. For example, each of the training fields may have duration of about 4μ, and each channel may be associated with a unique training field. Further, training fields of each channel may be sent over orthogonal resources separable in time, frequency and code sequence domains. Alternatively, multiple channels may share a common training field.

Referring now to the drawings, FIG. 1A depicts a wireless communication system 100 in accordance with one or more embodiments of the disclosure. For example, the illustrative wireless communication system 100 may comprise one or more user devices (e.g., user device(s) 120), one or more networks (e.g., networks 130) and one or more access points (e.g., access point(s) 140). Typically, the one or more user devices 120 communicate with the one or more access points 140 over the network 130.

One or more illustrative user device(s) 120 may be operable by one or more users (e.g., user(s) 110) are depicted in FIG. 1A. The user device(s) 120 (e.g., user devices 122, 124, and 126) may include any suitable processor-driven user device including, but not limited to, a desktop computing device, a laptop computing device, a server, a router, a switch, a smartphone, a tablet, wearable wireless device (e.g., bracelet, watch, glasses, ring, implant, etc.) and so forth.

Any of the user device(s) 120 (e.g., user devices 122, 124, and 126) and access point(s) 140 may be configured to communicate with each other and any other component of the wireless communication system 100 via one or more communications networks (e.g., networks 130). Any of the communications networks may include, but not limited to, any one or a combination of different types of suitable communications networks such as, for example, broadcasting networks, cable networks, public networks (e.g., the Internet), private networks, wireless networks, cellular networks, or any other suitable private and/or public networks. Further, any of the communications networks (e.g., networks 130 and 135) may have any suitable communication range associated therewith and may include, for example, global networks (e.g., the Internet), metropolitan area networks (MANs), wide area networks (WANs), local area networks (LANs), or personal area networks (PANs). In addition, any of the communications networks (e.g., networks 130 and 135) may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more user device(s) 120 may communicate with one or more access points 140 (e.g., data or other information types may be transmitted, retrieved, and/or received between the one or more user devices 120 and the one or more access points 140). The access point(s) 140 may be configured to provide access to one or more wireless and/or wireline networks. The access point(s) 140 may provide wireless signal coverage for a predefined area. The user device 120 may communicate with the access point(s) 140 wirelessly or through one or more network(s) 130. The access point(s) 140 may be a wireless access point, a router, a server, another mobile device, or any device that may wirelessly communicate with the user device 120 to provide the user device 120 access to a network, such as the Internet.

Any of user device(s) 120 and access point(s) 140 may include one or more communications antennae. Communications antenna may be any suitable type of antenna corresponding to the communications protocols used by the user device(s) 120 and access point(s) 140. Some non-limiting examples of suitable communications antennas include WiFi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals to and/or from the user devices(s) 120. Any of the user device(s) (e.g., user device(s) 120 and 150) and access point(s) 140, may include any suitable radio and/or transceiver for transmitting and/or receiving radio frequency (RF) signals in the bandwidth and/or channels corresponding to the communications protocols utilized by any of the user device(s) 120 and access point(s) 140 to communicate with each other. The radio components may include hardware and/or software to modulate and/or demodulate communications signals according to pre-established transmission protocols. The radio components may further have hardware and/or software instructions to communicate via one or more WiFi and/or WiFi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad) or any other 802.11 type channels (e.g., 802.11ax). In some embodiments, non-WiFi protocols may be used for communications between devices, such as Bluetooth, dedicated short-range communication (DSRC), Ultra-High Frequency (UHF), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some embodiments, downlink packet formats may follow one of the IEEE standards, (e.g., IEEE 802.11 ac). For example, the downlink data packet may contain a legacy preamble that may be compatible with legacy standards such as 802.11. The downlink data packet may also contain a very high throughput (VHT) preamble that may contain a number of timeslots that may have a certain time duration and that may contain various fields that may follow one or more IEEE standards (e.g., 802.11 ac).

Figure 1B:
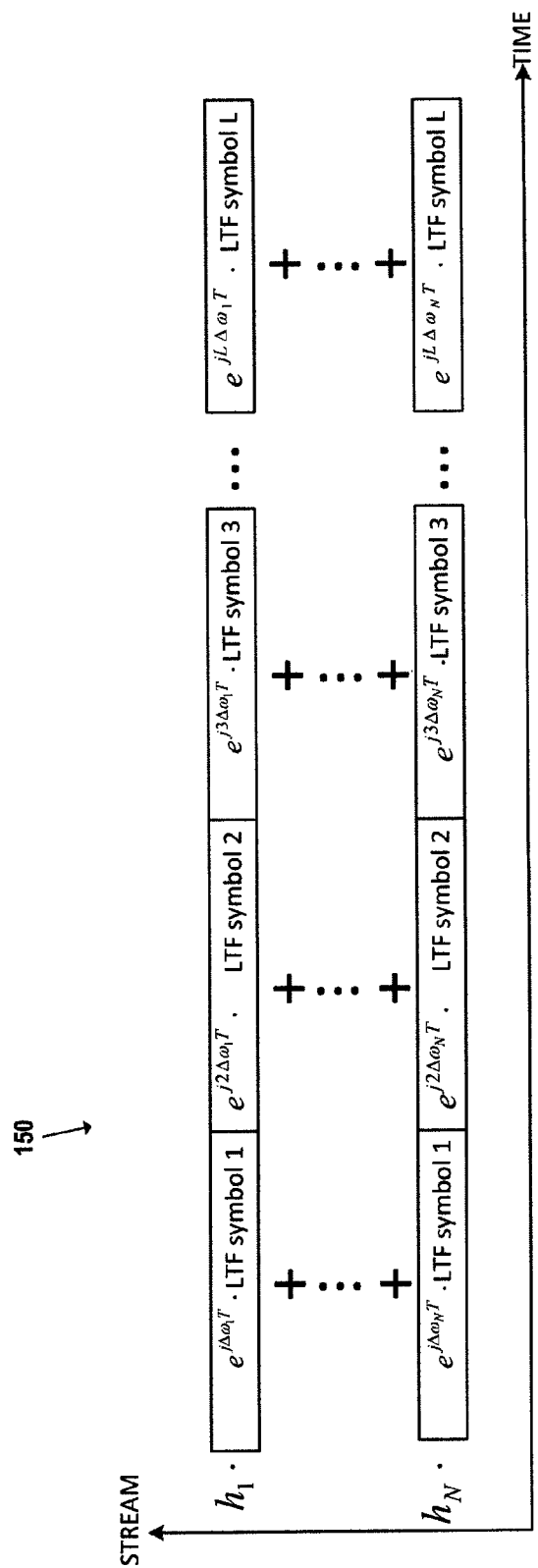
FIG. 1B depicts example signals received by a receiver from different users and/or devices, in accordance with one or more embodiments of the disclosure.

Referring now to FIG. 1B, a plurality of streams (e.g., signals) are illustrated, each having a different carrier frequency offset. Streams typically comprise a sequence of one or more LTF symbols and which are received by a receiver, such as access point(s) 140, from different channels (and/or subbands of channels) associated with different users and/or devices (e.g., user devices 120 or other devices such as a content-providing platform, a control system, a network distribution engine, wireless stations, and/or the like) in an uplink MU-MIMO. LTF symbols are then encoded into one or more streams (e.g., channel responses, signals at a particular carrier frequency, an audio signal, a video signal, a data signal, and/or the like) at the access point(s) 140 using P matrix codes in an uplink (e.g., upon transmittal of a stream from a user device 120 to an access point 140, for example).

Figure 1C:
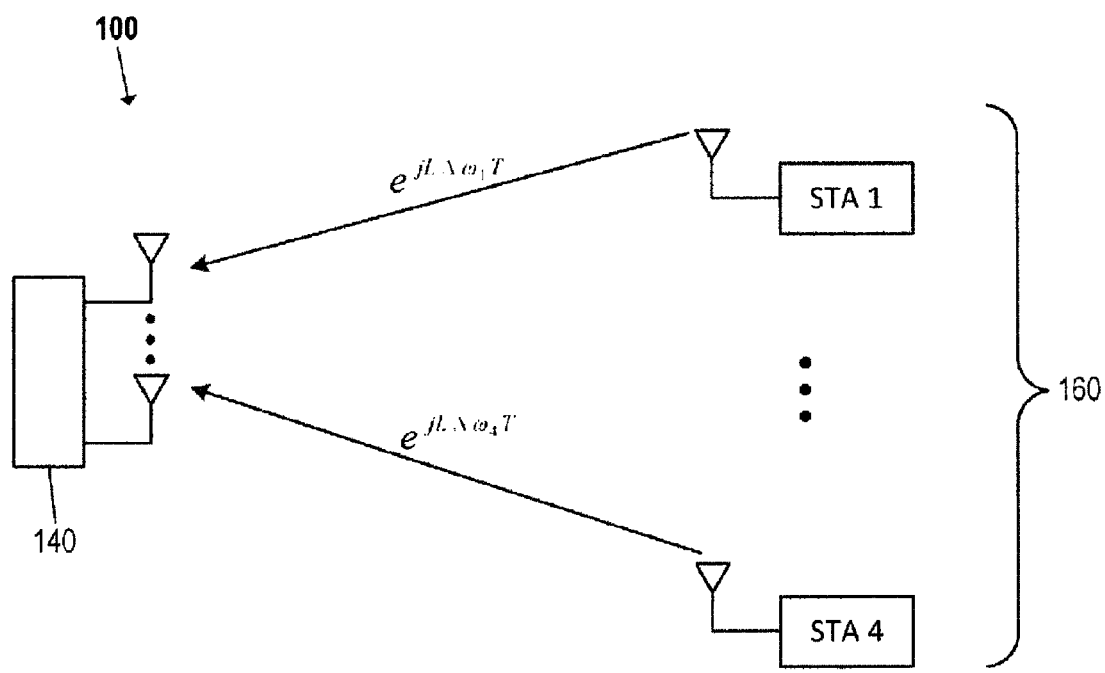
FIG. 1C depicts an illustrative example of data flow between components of an illustrative wireless communication system, in accordance with one or more embodiments of the disclosure.

In some embodiments, and as depicted in FIG. 1C, different LTF sequences and/or different P matrices may be used for encoding and/or decoding different streams in uplink. FIG. 1C depicts an uplink process between a plurality of stations 160 (e.g., STA, user devices, and/or the like) and an access point 140. In other instances, a P matrix-encoded LTF may be reused for uplink for different streams with various devices. In this way, the same P matrix may be used for both encoding and decoding different streams with sequences of LTF symbols. Encoding and/or decoding can occur during uplink or downlink transmissions at an access point 140 and/or a user device 120 (or other device). However, in such instances, a P matrix-encoded LTF in an uplink MU-MIMO may have the same or different carrier frequency offsets (CFOs) for each stream of channels and/or subbands of channels associated with different users and/or devices, as shown in FIG. 1B.

As such, it may be difficult to estimate a CFO of each user and/or user device 120 to accurately identify a carrier frequency of each channel due to interferences from various devices communicating on the same channels and/or subbands of channels. For example, having different CFOs on the same channel may introduce unwanted interferences among the uplink MU-MIMO streams and creates issues during processing (e.g., encoding and/or decoding) of streams. Furthermore, because the CFOs of the uplink devices may be calculated by via measuring (e.g., determining) a phase change across time of each device's signals transmitting streams of LTF symbol sequences, any introduced interference may skew estimations of CFOs. Therefore, in uplink MU-MIMO, CFO correction processes may be unable to utilize LTFs and may be delayed until pilots (e.g., identifiers in a header file of a stream used for encoding and/or decoding, and/or the like) in data transmissions are received.

For ease of receiver implementation at the access point 140, LTF symbol sequences of some or all streams are terminated at the same time in the uplink by user devices 120 an in the downlink by the access point 140. By terminating some or all streams of a channel and/or subbands of a channel at the same time in the uplink or in the downlink, the access point 140 assigns the same number of LTF symbols to each stream. In this manner, the number of LTF symbols for each channel and/or each subband of a channel is determined by the channel and/or subband of a channel with the maximum number of streams. The access point 140 (and/or a processing device of the access point 140) is configured to determine a number of streams in each channel and/or subband of a channel, compare the determined number of streams of each channel and/or subband of a channel to each other and/or a stored maximum number of streams, identify a new maximum number of streams, and assign a number of LTF symbols equal to the maximum number of streams to each channel and/or subband of a channel. Therefore, each channel and/or subband of a channel will have the same number of LTF symbols in its LTF sequence used for encoding and/or decoding P matrices.

For the channels and/or subbands of a channel determined to have a number streams less than the maximum number of streams, extra LTF symbols (e.g, additional LTF symbols that aren't required for transmitting signals (e.g., streams) on the channels and/or subbands of a channel determined to have a number streams less than the maximum number of streams) can be added to the LTF symbols in the LTF symbol sequence that is required for transmitting signals (e.g., streams) on each channel and/or subband of a channel. For example, the first few rows of a larger P matrix as in 802.11n/ac may be utilized in conjunction with a smaller P matrix that is required when transmitting signals on each channel determined to have a number streams less than the maximum number of streams. However, this method may not allow the receiver to decode the channel response using part of LTF symbols.

For CFO estimation (e.g., determination) as described herein, the receiver (e.g., a device, a user device 120, and/or the like) can observe channel responses (e.g., signals and/or streams including LTF symbol sequences) separated in time such that a difference in phase can be detected and then used for CFO estimation of the channel. Instead of using the first few rows (or columns) of a larger P matrix for encoding and/or decoding of LTF symbols into a stream, a P matrix as small as possible may be selected such that the receiver (e.g., an access point 140 and/or a user device 120) can decode the channel response with the smallest number of LTF symbols. For example, if the number of required LTF symbols for the whole channel is four and a subband of a channel has two streams, then a selected P matrix used for encoding and/or decoding may be a 2×2 P matrix instead of a legacy 4×4 P matrix. Typically, a P matrix is a square orthogonal matrix, wherein all rows of the P matrix are orthogonal with each other, and all columns are also orthogonal with each other. However, while a P matrix may be desirable, any orthogonal matrix can be used in place of a P matrix.

In addition and as discussed above, additional LTF symbols may be padded (e.g., added into one or more columns of a selected P matrix) because a code length of a transmission is shorter than a number of LTF symbols required for transmitting a stream. The code length of a transmission may be determined by the access point 140 and may correspond to a number of LTF symbols required for transmission of a stream. For example, a subband of a channel that includes four streams may require four LTF symbols for transmission, whereas a second subband of the same channel may include only two streams and therefore may require only two LTF symbols for transmission. In this manner, the access point 140 determines that the second subband has a shorter code length than the first subband based on a comparison of a number of required LTF symbols for each subband. The access point 140 then may determine that two additional LTF symbols are to be padded into the second subband transmission so that the number of LTF symbols of the first and second subbands (and potentially all other subbands in the same channel) are the same. The access point 140 may further determine a P matrix size required for transmission using a channel and/or subband of a channel based on a required number of LTF symbols.

In some embodiments, a sequence of LTF symbols may be utilized for encoding and/or decoding a transmission, such as a channel response. Sequences of LTF symbols may be included at the beginning and/or the end of a transmission in a data header. Alternatively, sequences of LTF symbols may be embedded into a transmission data signal using digital watermarking and/or other encoding techniques common in the art. Typically, LTF symbols are encoded into a transmission data signal using a P matrix. Again, using the smallest P matrix possible based on a determined number of streams in a channel and/or subband of a channel, additional LTF symbols are padded such that a channel response (e.g., a stream, a transmission of data, content, and/or the like) can be encoded and/or decoded with the fewest LTF symbols at the end and/or beginning of a LTF symbol sequence. Finally, for maximizing time separation between channel observations (e.g., receipt of channel responses), a number of P matrix columns is determined and selected by the access point 140 such that the beginning and/or the end of an LTF symbol sequence has a complete set of LTF symbols sufficient to encode and/or decode the channel response after its transmission. In this manner, the access point 140 and user devices 120 are enabled to communicate with one another using a common sequence of LTF symbols.

Figure 2:
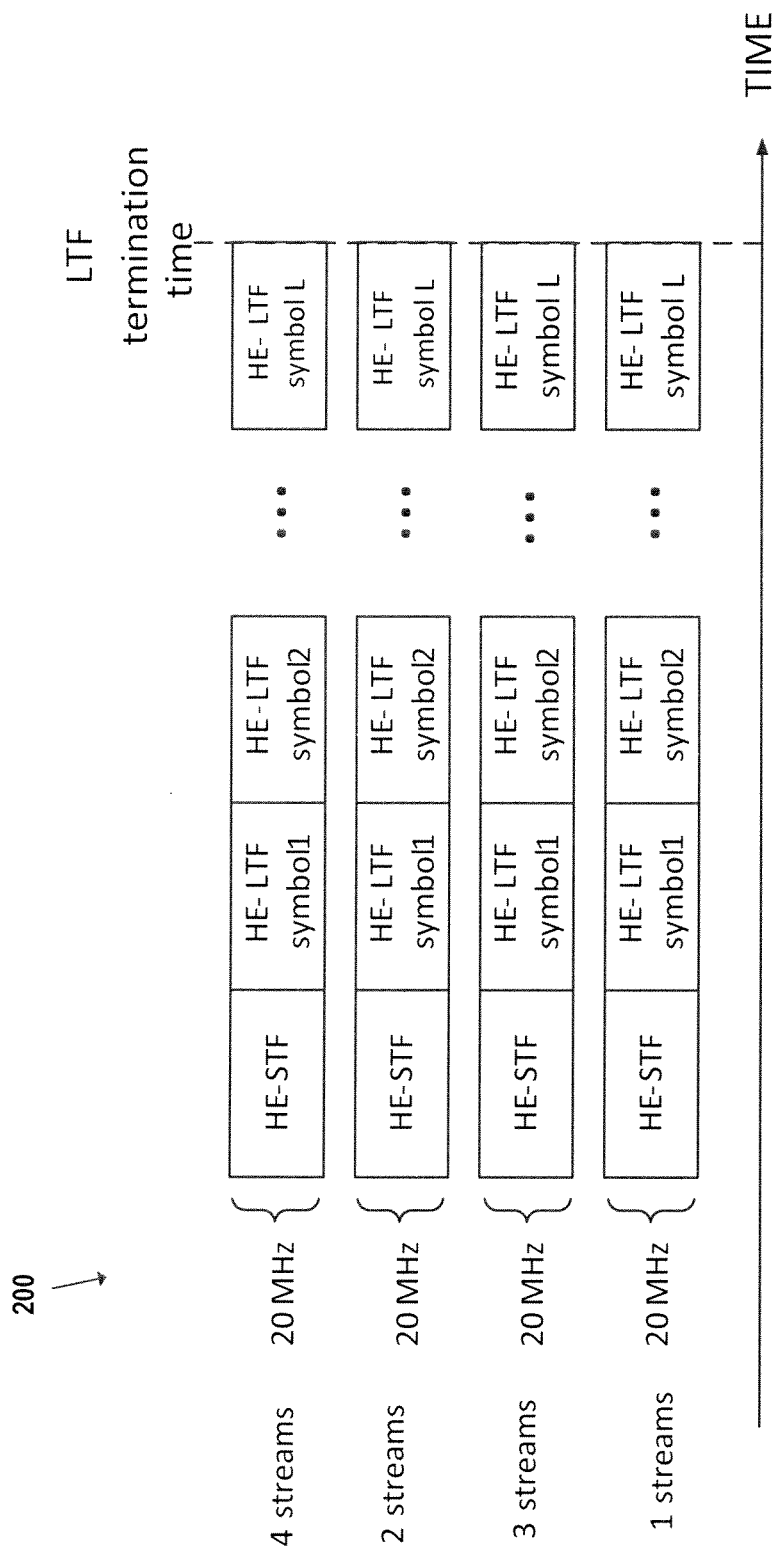
FIG. 2 depicts example long training fields and termination times, in accordance with one or more embodiments of the disclosure.

Referring now to FIG. 2, an example 80 MHz channel 200 is illustrated with streams of all subbands terminated at the same time during an encoding process at an access point 140. The access point 140 may determine and/or assign termination times to the streams across the whole channel at a common time so that the termination times may be aligned (e.g., the same and/or substantially the same). This alignment of termination times of streams simplifies receiver implementation of the user device 120 and/or the access device 140 (or another device). However, some subbands of the channel may include a larger number of streams and therefore require more LTF symbols for encoding, decoding, receipt, and/or transmission, while other subbands may include a fewer number of streams and therefore require fewer LTF symbols for encoding, decoding, receipt, and/or transmission. HE-STF, as shown in FIG. 2, indicates high efficiency short training field. As such, the number of LTF symbols required for estimating a channel response of each channel and/or subchannel may vary between channels and/or subbands of channels, and padding of additional LTF symbols may be required for channels and/or subbands of channels that have a fewer number of streams than a number of LTF symbols determined to be required for all channels and/or subbands of a channel.

Figure 3:
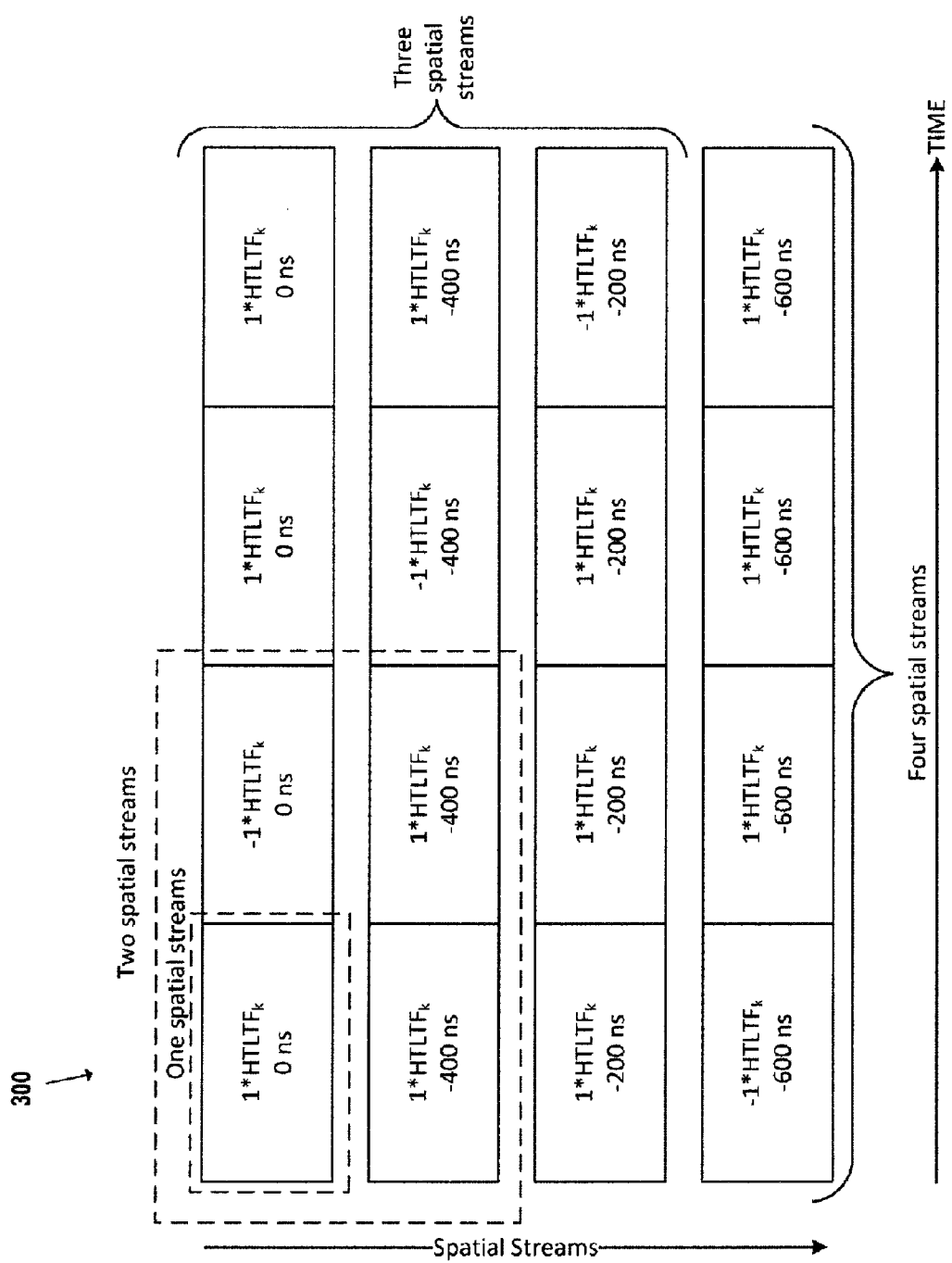
FIG. 3 depicts an example long training field structure, in accordance with one or more embodiments of the disclosure.

Referring now to FIG. 3, illustrating LTF structure 300 in 802.11n/ac standard wireless communication, the number of streams of a channel and/or a subband of a channel can be smaller than a number of LTF symbols required for the channel (and, if applicable, all of its included subbands). For example, if the number of streams is three, the number of LTF symbols can be four. In this case, the P matrix for four streams is used and the first three rows are used to fill the P matrix with LTF symbols, thereby forming a 3×4 code matrix, as shown in FIG. 3. The 1 and −1 coefficients in FIG. 3 form a 4×4 P matrix $$\begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

Figure 4:
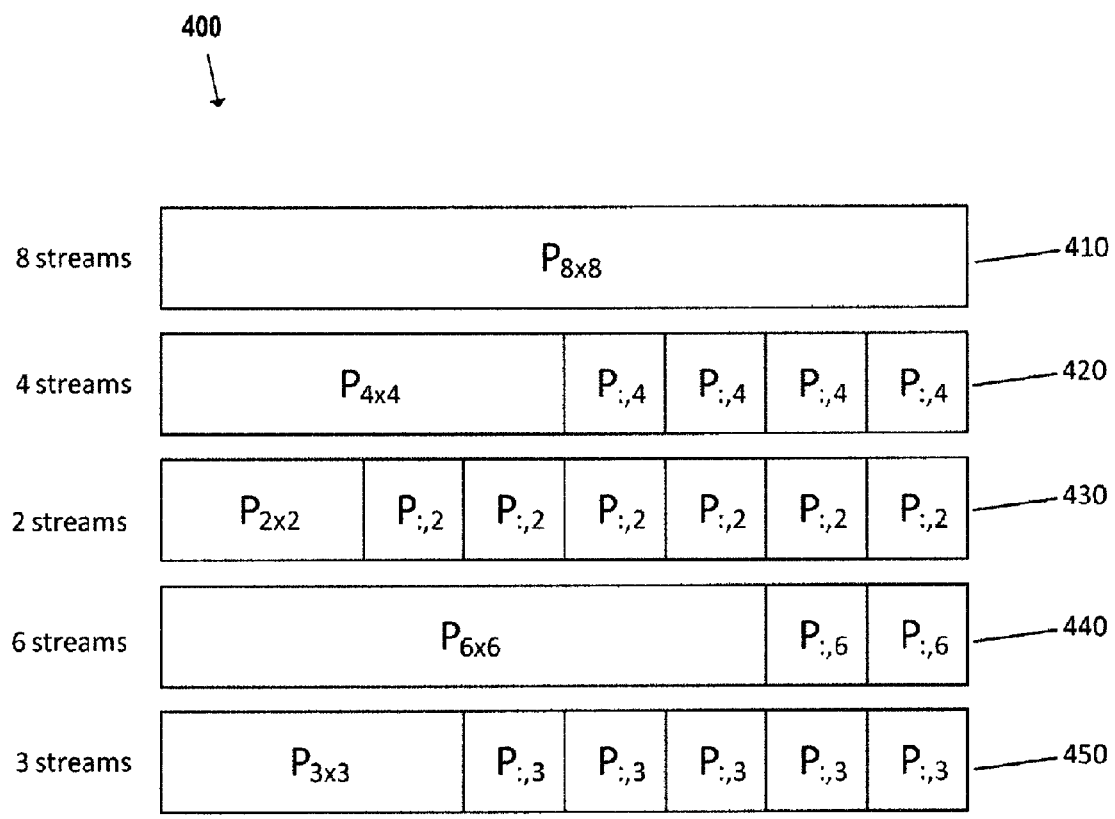
FIG. 4 depicts an example padding of long training field symbols, in accordance with one or more embodiments of the disclosure.

Referring now to FIG. 4, FIG. 4 depicts an example design 400 illustrating padding of LTF symbols that may not support CFO estimation. For example, in FIG. 4, there are eight LTF symbols required for transmission as determined by a first subband 410 including eight streams. The first subband 410 has eight spatial streams and uses an 8×8 P matrix code to encode, decode, receive, and/or transmit the eight LTF symbols for each of the eight streams in the first subband 410. A second subband 420 has four streams. So, instead of using the first the four rows of the aforementioned 8×8 P matrix code to encode, decode, receive, and/or transmit the four LTF symbols for each of the four streams in the second subband 420, the second subband 420 may utilize a 4×4 P matrix code to encode, decode, receive, and/or transmit the four LTF symbols for each of the four streams in the second subband 420. For the four remaining LTF symbols that are required to be included in the transmission, the design of FIG. 4 would encode the four remaining LTF symbols consistently using one column of the 4×4 P matrix (e.g., the last column; the fourth column denoted by $P_{:,4}$). In this way, the four LTF symbols for encoding the four streams in the second subband 420 are padded with the four remaining LTF symbols. Similarly, the same design can be applied to the other subbands 430, 440, 450 with less than eight streams as shown in FIG. 4.

Although the design 400 of FIG. 4 appears simple, it may not support accurate CFO estimation. For example, for the second subband 420 of FIG. 4, although the receiver can obtain a complete set of CFO estimates using the first four LTF symbols (e.g., the symbols pertaining to the four streams of the second subband 420), it cannot get a second set using the last four LTF symbols (e.g., the padded LTF symbols) because the P matrix columns of the last four symbols do not form an invertible matrix, which may be required for obtaining a complete set of CFO estimates.

In some embodiments, an access point 140 may select and/or determine a number of LTF symbols for all subbands and/or subchannels. A P matrix size is then determined based on the selected number of LTF symbols. Typically, the determined P matrix size is the same as the selected number of LTF symbols (e.g., 2, 4, 8, and/or the like). For example, if 4 LTF symbols are required for transmission on each subband and/or subchannel, then the P matrix size may be 4×4. In this manner, a P matrix of a common size may be utilized for all subbands and/or subchannels. Furthermore, if a subband and/or subchannel has 'N' streams, then the first N rows of the P matrix may be used.

In some embodiments, CFO estimation includes determining a time difference between clocks of a transmitter (e.g., an access point 140) and a receiver (e.g., a user device 120). For example, the receiver may obtain at least two observations (e.g., data points) about a channel response (e.g., a stream) of a channel and/or a subband of a channel at two different times. First, a stream (e.g., a channel response, a data signal, a transmission, a pulse, a ping, and/or the like) is generated and encoded with LTF symbols by the transmitter. The stream is then transmitted by the transmitter to the receiver. During reception of the stream, the receiver measures (e.g., determines) a first phase of the channel and/or subband on which the stream is transmitted and/or received. The measured (e.g., determined) first phase and a first time-stamp of the stream transmission can be recorded (e.g., stored). Next, a subsequent training signal (e.g., an additional LTF symbol of the transmitted stream) is received by the receiver. Upon receipt of the additional training signal of the stream at the receiver (e.g., upon receiving a first LTF symbol at the beginning of an LTF symbol sequence), the receiver measures (e.g., determines) a second phase of the channel and/or subband on which the signal is transmitted and/or received. The measured (e.g., determined) second phase and a second time-stamp can be recorded (e.g., stored). The receiver may also measure (e.g., determine) a third phase of the channel and/or subband on which the signal is transmitted and/or received upon receipt of a last LTF symbol at the end of an LTF symbol sequence. The measured (e.g., determined) third phase and a third time-stamp can be recorded (e.g., stored).

Alternatively, a plurality of streams may be transmitted and/or received at different times. The receiver and/or the transmitter may be the device responsible for obtaining a first, second, third, and any subsequent phase measurement and/or time-stamp of a stream. In some embodiments, creating a larger difference in time between obtaining first and second observations (and any subsequent observations) about a channel response may assist in providing more accurate measurements of phase difference of a channel and/or a subband of a channel, thereby resulting in a more accurate calculated CFO. For example, for a given CFO, a larger time difference typically corresponds to a larger phase difference, which provides a more accurate CFO estimation. Additionally, more than two or three observations may be obtained, and multiple phase measurements may be taken and processed.

Typically, a carrier frequency offset (CFO) is associated with a receiver and/or a transmitter device that has a clock difference between another device (e.g., a transmitter and/or a receiver). In some embodiments, a single subband and/or subchannel may facilitate communication between multiple receiving devices (in downlink multi-user MIMO, for example) and/or between multiple transmitting devices (in uplink multi-user MIMO, for example). A CFO is typically calculated between each pair of receiving devices and transmitting devices.

A CFO of the channel and/or subband of the channel can be estimated from the phase difference between the channel responses. So, the first phase and the second phase are processed by a computing device to calculate a phase difference between the first phase and the second phase. A carrier frequency offset (CFO) is then calculated based on the calculated phase difference divided by a calculated time difference corresponding to a measured difference between two phase measurements. In this manner, CFO estimation for a channel and/or subband of a channel whose number of streams is less than the number of LTF symbols may be determined using the systems, methods, and apparatuses described herein.

In some embodiments of the present disclosure, the number of LTF symbols of each subband of an entire channel may be determined by a subband with the maximum number of streams. Let n1×n1, n2×n2, . . . , nP×nP be the P matrix sizes defined in the new standard equal to or greater than the maximum number of streams among all subbands. For example, in legacy 802.11ac, defined P matrix sizes are 2×2, 4×4, 6×6, and 8×8. For maximum seven streams, a 8×8 P matrix can be used, and eight LTF symbols are needed.

In certain embodiments of the present disclosure, a LTF symbol number of a particular channel and/or a subband of a channel may be indicated by an access point 140 or a mobile station (e.g., a user device 120, a transmitter, a receiver, and/or the like). In this way, the same LTF symbol sequence may be assigned to a plurality of signals, thereby ensuring more reliable channel encoding, decoding, and/or CFO estimation. For example, a transmitter's clock may fluctuate due to a switch from receive mode to transmit mode (e.g., when switching between an uplink mode and a downlink mode). In some embodiments, a clock settling time of some devices may be the same or different than others. Therefore, additional LTF symbols may be used for accommodating devices with a slower settling to thereby increase accuracy of any CFO estimations.

For each channel and/or subband of a channel, the smallest code matrix C for encoding and/or decoding a LTF symbol sequence may be determined. For example, N may be a number of streams of a channel and/or a subband of a channel. If an N×N P matrix is defined in a wireless standard, the code matrix C can be an N×N P matrix. Otherwise, suppose M is the smallest number that has a defined M×M P matrix in a wireless standard, where M≥N. N rows (or columns) of the M×M P matrix can be used to form the code matrix C. For example, if an N×M P matrix is used, the code matrix C can defined by the first N rows (or columns) of the defined M×M P matrix. In another example, if the number of streams is two and the number of LTF symbols is four, then two defined 2×2 P matrixes may be used for LTF symbols. In contrast, other designs may use the first two rows of the 4×4 P matrix. If a channel and/or a subband of a channel has a number of streams equal to three but a 3×3 P matrix is not defined in the standard, the first three rows of the smallest defined P matrix that supports three streams may be used (e.g., 4×4 P matrix). Using the smallest code matrix C, as described herein, allows the receiver to obtain channel observations (and therefore calculate estimates of CFOs) using the fewest or least number of LTF symbols as allowed by wireless standards.

For each channel and/or a subband of a channel, after a smallest N×M code matrix C is determined, where N≤M, both first M symbols (e.g., a first column of M) and the last M symbols (e.g., a last column of M) of the LTF symbol sequence are encoded by the code matrix C completely. As a result, a device (e.g., a receiver, a transmitter, a user device 120, and/or the like) can obtain a set of channel estimates (e.g., phase measurements, CFO estimates, and/or the like) using first M LTF symbols when first receiving and/or decoding at a beginning of a LTF sequence and another set of channel estimates using last M LTF symbols at an end of the same LTF sequence. Note that M can be at least a number of LTF symbols required for obtaining a set of channel estimates by inverting the N×M code matrix C. Again, a larger time separation between obtaining two (or more) sets of channel observations results in a greater phase difference and, therefore, more accurate CFO estimations.

Figure 5:
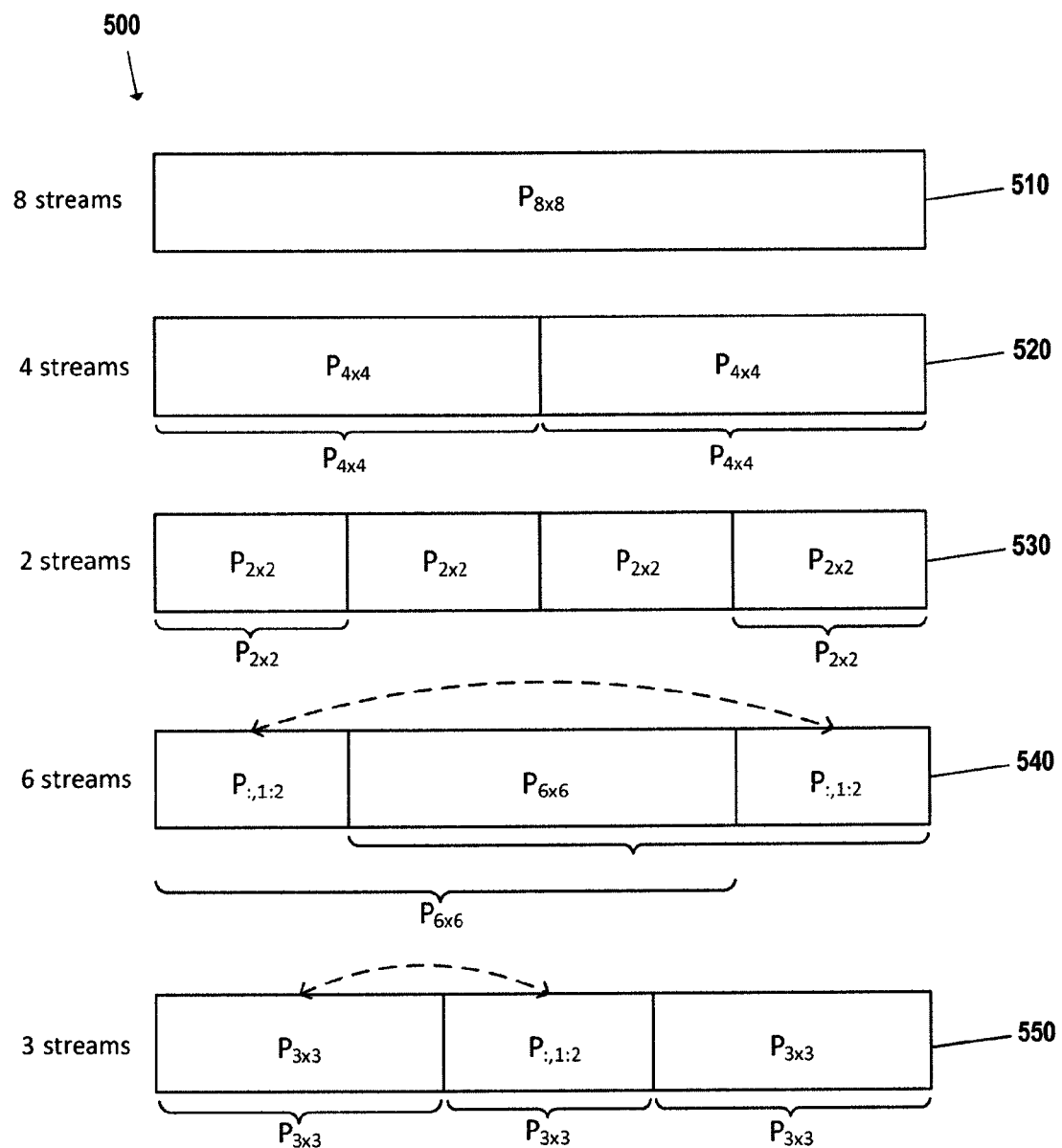
FIGS. 5-6 depict example matrix designs, in accordance with one or more embodiments of the disclosure.
Figure 6:
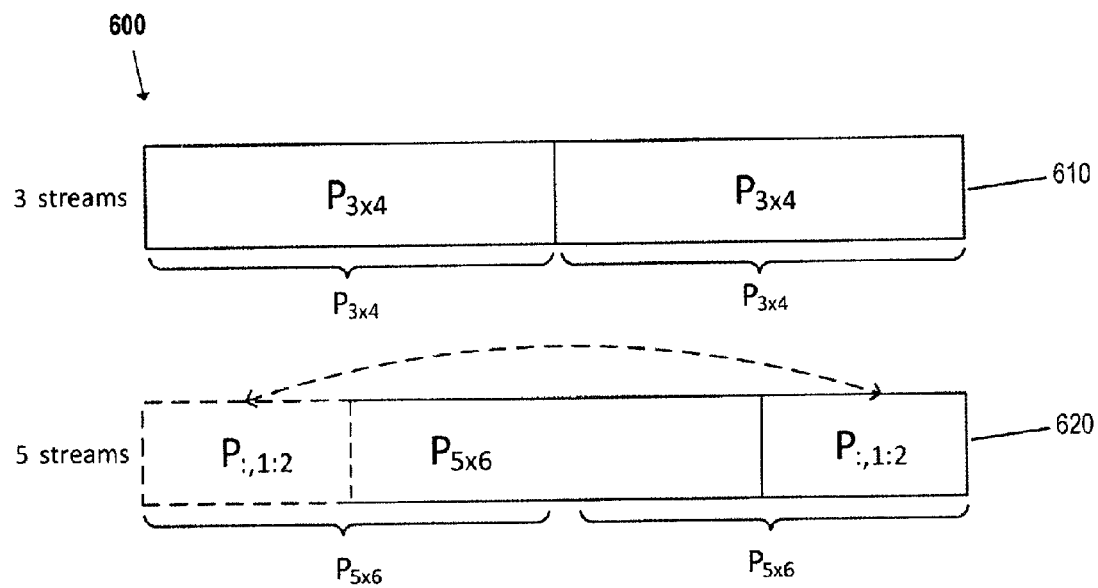

The design approaches of the present disclosure can be further understood by the examples in FIGS. 5-6. Referring first to FIG. 5, suppose square P matrices are defined for each subband of a channel 500, wherein each subband has a different number of streams (e.g., ranging from 1, 2, . . . , 8). In some embodiments, the systems and methods described herein may determine a number of LTF symbols for a channel and/or a subband of a channel. For the example in FIG. 5, the number of LTF symbols of each subband 510, 520, 530, 540, 550 of channel 500 is eight, as determined by the first subband 510.

For a second subband 520 with four streams, the design may be straightforward. A usable code matrix C of the second subband 520 can be a 4×4 P matrix. The code matrix C of the second subband 520 can be used to encode four first LTF symbols (e.g., four LTF symbols required for encoding, decoding, transmitting, and/or receiving data on the second subband 520) and four last LTF symbols (e.g., four padded LTF symbols required based on the determined number of LTF symbols for the channel as a whole), respectively.

Similarly, for a third subband 530 with two streams, a usable code matrix C can be a 2×2 P matrix in which eight LTF symbols are encoded by the code matrix C by four times.

For a fourth subband 540 with six streams, a design is less straightforward. In some embodiments, a first complete 6×6 P matrix can be used for the encoding of six first LTF symbols. For six last LTF symbols, a second complete 6×6 P matrix encoding may be also used. However, since only eight LTF symbols are required for each subband of the channel 500 (instead of twelve as expected when using two 6×6 P matrices), the first complete 6×6 P matrix at a beginning of a stream of LTF symbols overlaps with the second complete 6×6 P matrix at an end of a stream of LTF symbols by four LTF symbols as shown in the fourth row of FIG. 5 (e.g., the fourth subband 540). In some embodiments, the overlapping four symbols are encoded by the last four columns of the first complete 6×6 P matrix, the first four columns of the second complete 6×6 matrix, or both. In this way, the remaining two columns of either 6×6 P matrix (e.g., the first two columns of the first complete 6×6 matrix and/or the last two columns of the second complete 6×6 matrix) may be used to encode the first two LTF symbols and/or the last two LTF symbols in the LTF symbol sequence.

Effectively, the last six LTF symbols in the LTF sequence are encoded by a cyclically shifted 6×6 P matrix. Because of the overlapping of four LTF symbols, two sets of channel estimates can be obtained from the first six LTF symbols and/or the last six LTF symbols, respectively, and a CFO can be estimated from measured phase differences between the two sets of channel estimates. For the fifth subband 550 at the bottom of FIG. 5, three streams are sent using the required eight LTF symbols. As depicted, a 3×3 P matrix can be used to encode the first and/or the last three LTF symbols of the LTF sequence. For the two remaining LTF symbols in the middle of the LTF sequence, a portion of the first and/or the last three LTF symbols may be used to make a complete 3×3 P matrix encoded segment. More particularly, in FIG. 5, the remaining two LTF symbols in the middle of the LTF sequence can be encoded using the last two columns of a 3×3 P matrix such that the 4th, 5th, and 6th LTF symbols are encoded by a shifted 3×3 P matrix. Alternatively, the remaining two LTF symbols in the middle of the LTF sequence can be encoded using the first two columns of a 3×3 P matrix such that the 3rd, 4th, and 5th LTF symbols are encoded by a shifted 3×3 P matrix. In either manner, only one LTF symbol will overlap with an adjacent 3×3 P matrix (e.g., either a 3×3 P matrix that encodes the first three LTF symbols of the LTF sequence or a 3×3 P matrix that encodes the last three LTF symbols of the LTF sequence). As such, three sets of channel estimates can be obtained at the receiver by decoding the 3×3 P matrix encoded segments.

FIG. 6 shows examples where the code matrix C of a channel 600 is a square matrix, or the same as the P matrix. Assuming 3×3 and 5×5 P matrixes are not defined by wireless standards but 4×4 and 6×6 are defined in wireless standards, the smallest code matrixes for a first subband 610 including three streams and a second subband 620 including five streams are 3×4 and 5×6, respectively. Respectively, the 3×4 matrix and the 5×6 matrix are portions of corresponding 4×4 and 6×6 P matrixes (e.g. the first three or five rows of the corresponding square P matrixes). In other embodiments, the structuring illustrated in FIG. 5 may be applied, for example where the number of LTF symbols is eight, as shown in FIG. 6.

Figure 7:
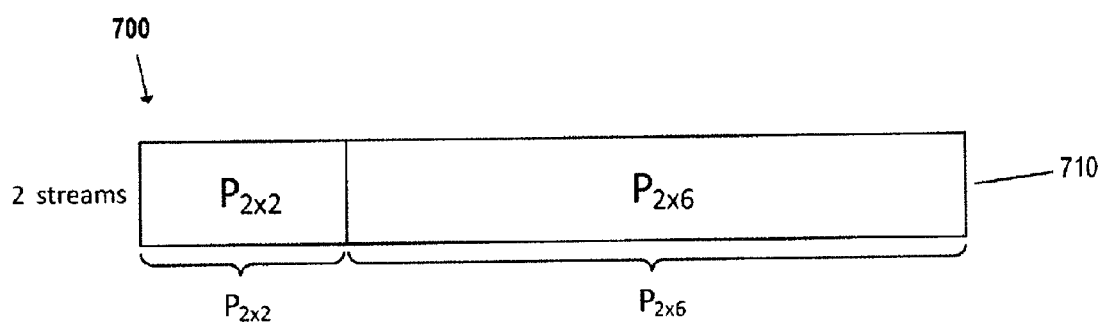
FIG. 7 depicts an example of filling long training field symbols, in accordance with one or more embodiments of the disclosure.

The embodiments of FIGS. 5-6 may use one code matrix size to encode and/or pad all required LTF symbols of an LTF sequence. In an alternative embodiment illustrated in FIG. 7, multiple P matrices of different sizes may be used to encode and/or pad all required LTF symbols of an LTF sequence in a channel 700. For example, in FIG. 7, to encode subband 710 that includes two streams, two P matrices with dimensions of 2×2 and 6×6 can be used. The first two LTF symbols are encoded by the 2×2 P matrix. The last six symbols are encoded by two rows of the 6×6 P matrix. Using multiple P matrices of different dimensions may address redundancy of encoding the same LTF symbols multiple times with partially overlapped P matrixes illustrated in FIGS. 5-6.

Figure 8:
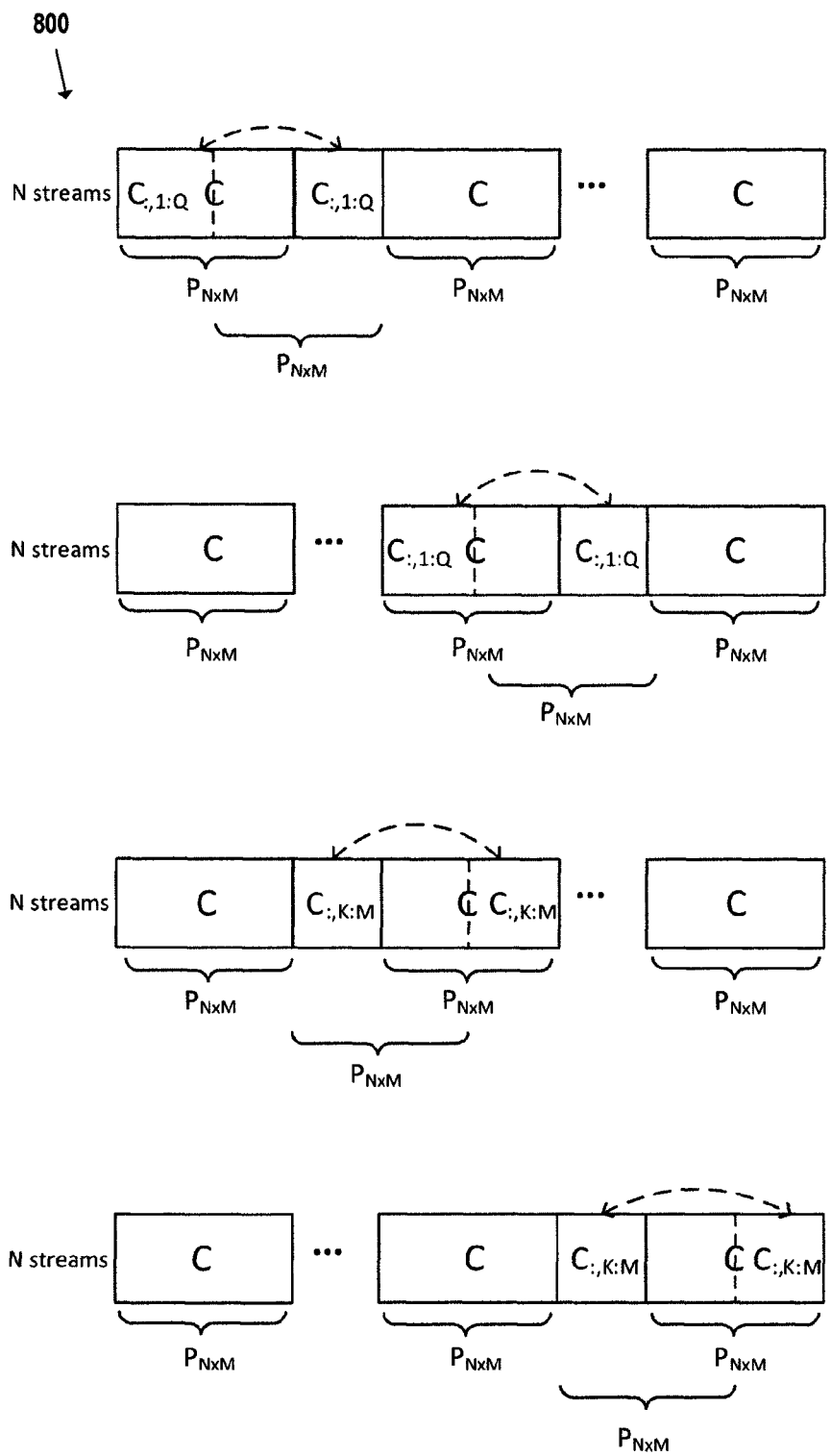
FIGS. 8-9 depict example packing of a matrix, in accordance with one or more embodiments of the disclosure.

Referring now to FIG. 8, the embodiments discussed in FIGS. 5-6 are summarized, where denotes a submatrix of the N×M code matrix C formed by the columns from I to J of the code matrix C when encoding a channel 800. In some embodiments, K and Q are determined by a number of LTF symbols and dimensions N and M of the selected code matrix C. $C_{:,1:Q}$ and $C_{:,K:M}$ are the first Q columns and the last M−K+1 columns of code matrix C, respectively. Both $C_{:,1:Q}$ and $C_{:,K:M}$ may be the partial or complete code matrix C in some cases. A self-decodable code matrix may be placed at the beginning and/or the end of the LTF sequence. The self-decodable code matrix may be the C matrix or shifted C matrix as in FIG. 6 or a larger matrix as in FIG. 7. A self-decodable matrix may be invertible by inversion or pseudo inversion for getting N channel estimates of all N streams.

Figure 9:
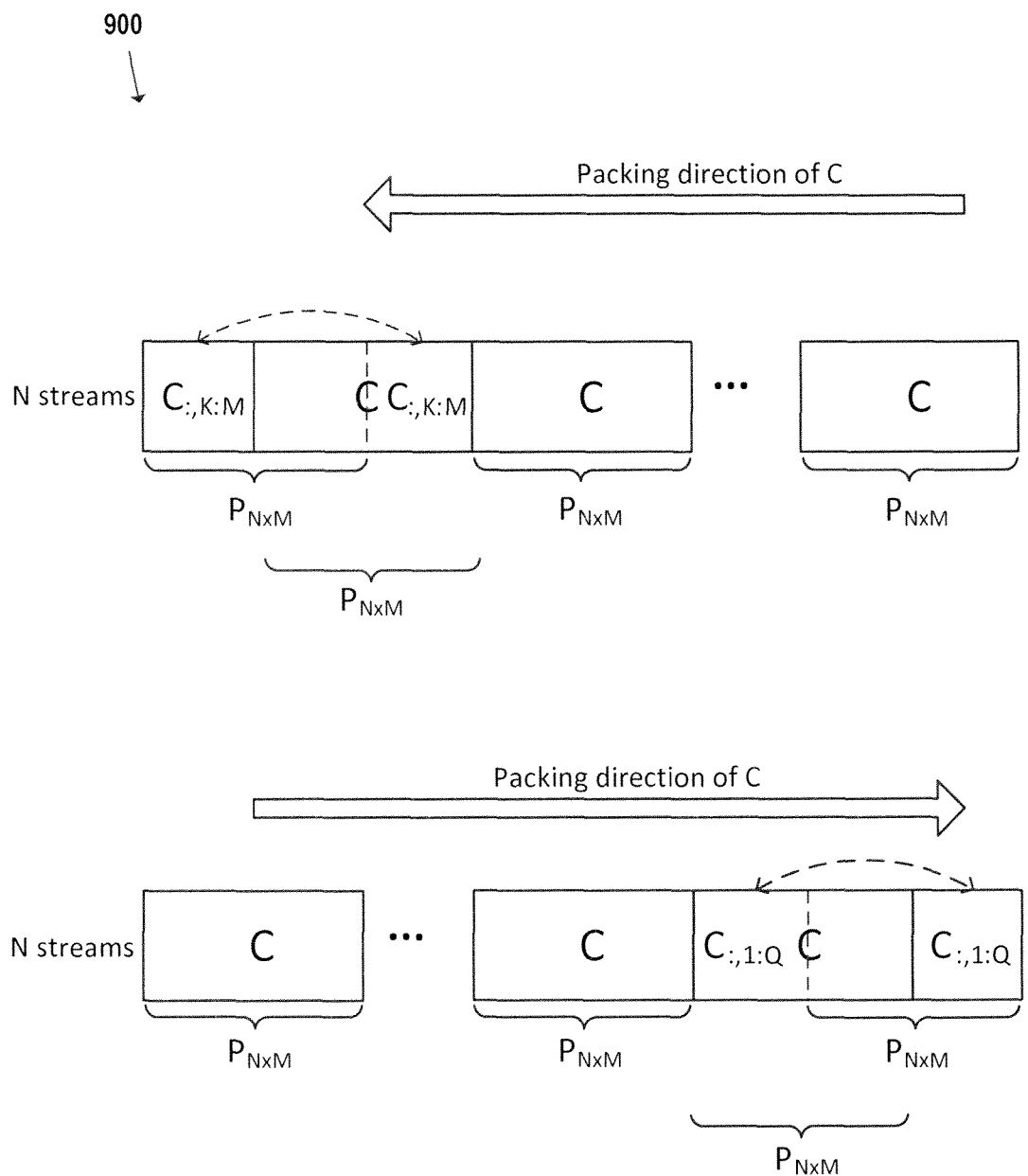

Referring now to FIG. 9, another embodiment of encoding a code matrix C with an LTF symbol sequence in a channel 900 is illustrated. Code matrix C may be encoded and/or padded from the left (e.g., the beginning, the front, and/or the like) to the right (e.g., the end, the back, and/or the like) or vice versa as shown in FIG. 9. If there are remaining column(s) in a matrix at the end of an encoded LTF sequence (e.g., remaining columns after an LTF sequence has been fully encoded), a decodable code matrix can be made by either adding complementary columns to make cyclically shifted code matrix or by replacing a last padded code matrix with a larger decodable code matrix to encode and/or pad any leftover column(s).

Figure 10:
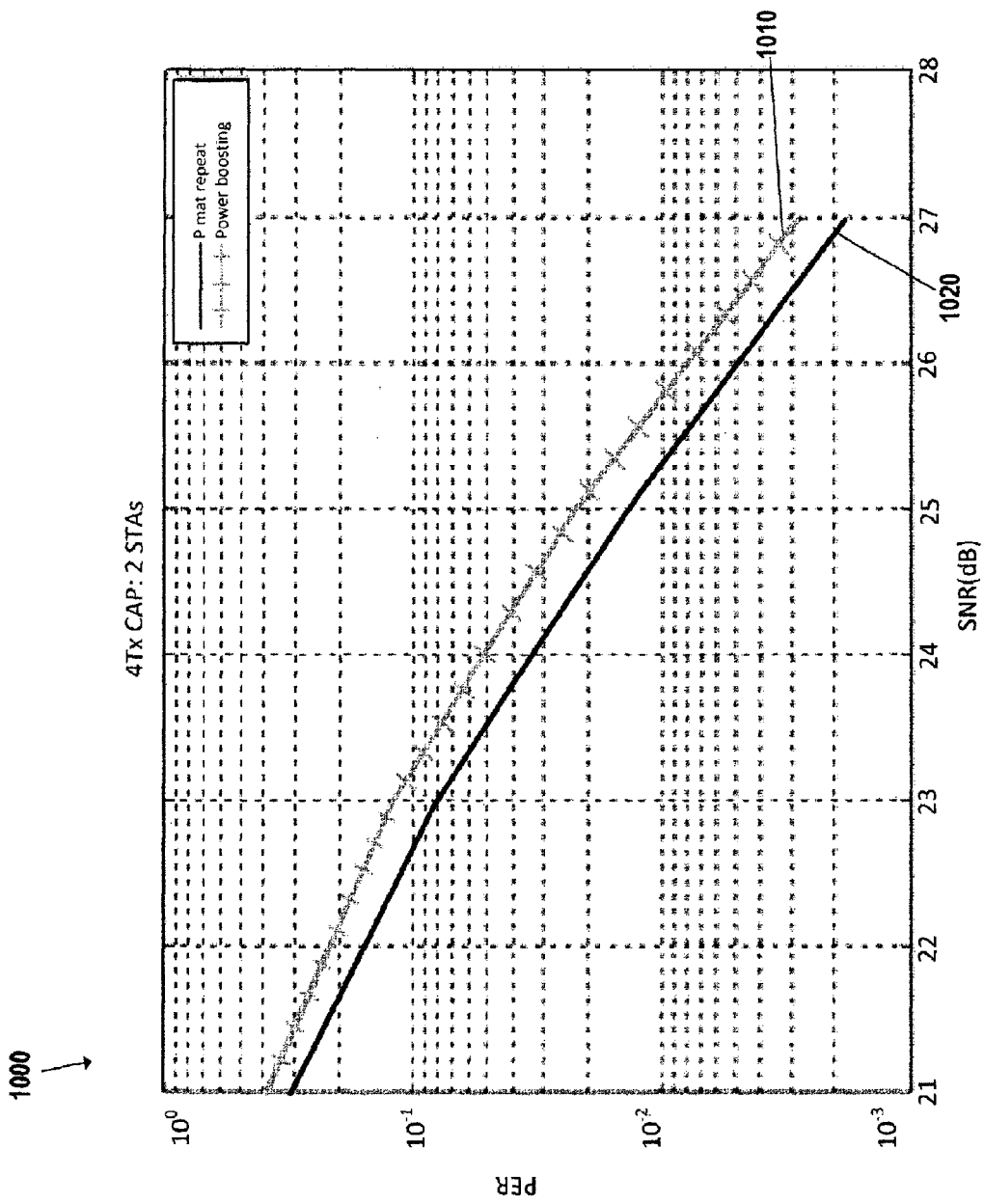
FIG. 10 depicts example packet error rate performance in graph form, in accordance with one or more embodiments of the disclosure.

Referring now to FIG. 10, results 1000 of a simulation are provided with the following settings: four antennas at an access point 140; two receiving stations 120 (STAs) each with one antenna; MCS 7; 802.11 channel model D with non-line-of-sight (NLoS) condition; CFOs of +200 Hz and −200 Hz for each STA; phase tracking is enabled for each STA at the AP; CFO compensation is used for the proposed scheme with repeated code matrix C i.e. two 2×2 P matrixes; channel smoothing is not applied; and four LTF symbols are used. Line 1010 "Power boosting" in FIG. 10 is a baseline using the first two rows of the 4×4 P matrix. Line 1020 "Pmat repeat" incorporates aspects of the present disclosure using two 2×2 P matrix. A gain of 0.5 dB is observed. Clearly, CFO estimation based on measured phase differences provides advantages in wireless communications.

Figure 11:
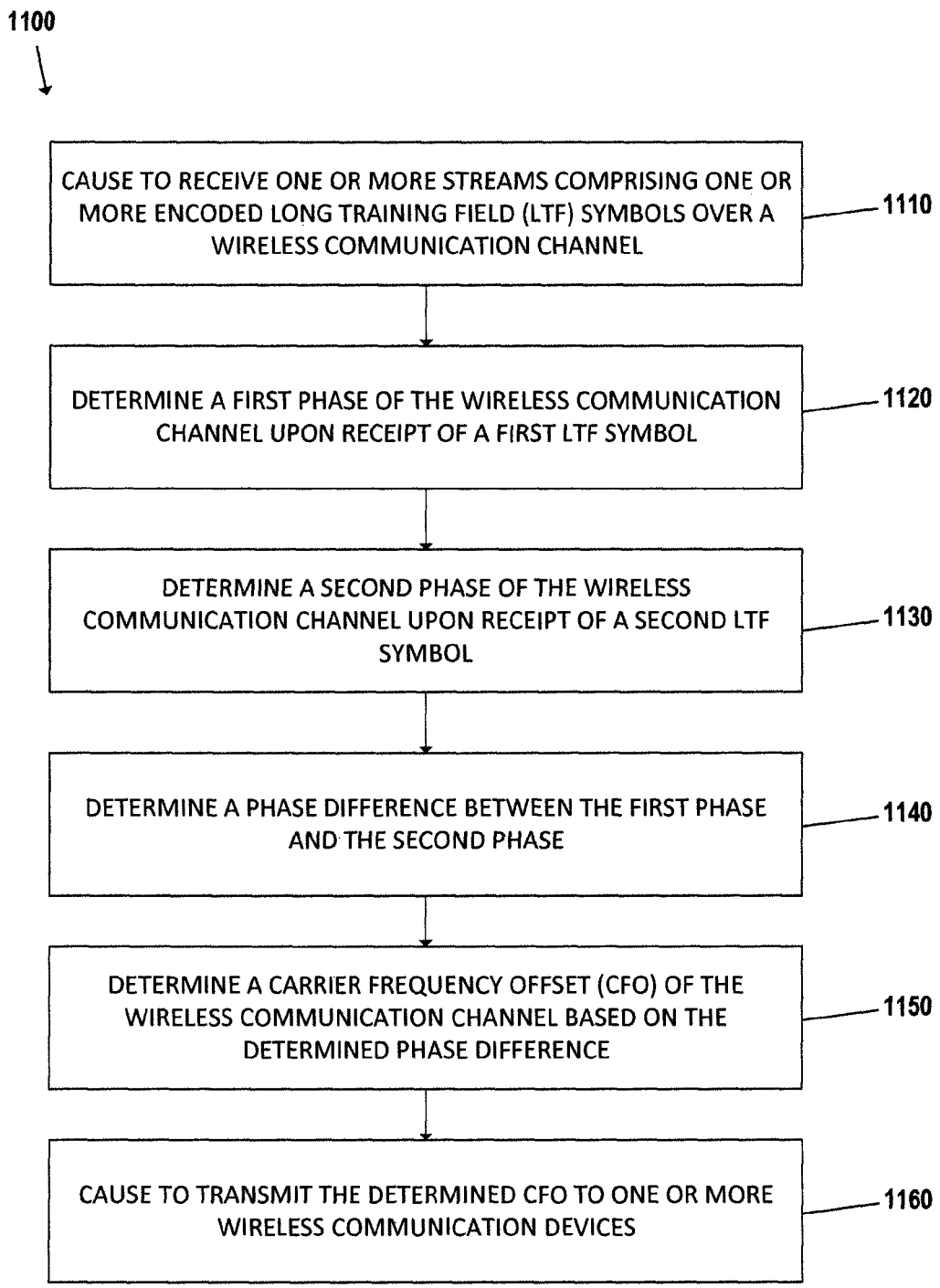
FIG. 11 depicts an example process flow for estimating carrier frequency offset for long training fields, in accordance with one or more embodiments of the disclosure.

FIG. 11 is an example process flow 1100 for estimating carrier frequency offset for long training fields, in accordance with one or more embodiments of the disclosure. At block 1110, the process includes receiving one or more streams comprising one or more encoded long training field (LTF) symbols over a wireless communication channel. At block 1120, the process includes determining a first phase of the wireless communication channel upon receipt of a first LTF symbol. At block 1130, the process includes determining a second phase of the wireless communication channel upon receipt of a second LTF symbol. At block 1140, the process includes determining a phase difference between the first phase and the second phase. At block 1150, the process includes estimating a carrier frequency offset (CFO) of the wireless communication channel based on the determined phase difference. At block 1160, the process includes modifying the wireless communication channel based at least in part on the determined CFO.

Figure 12:
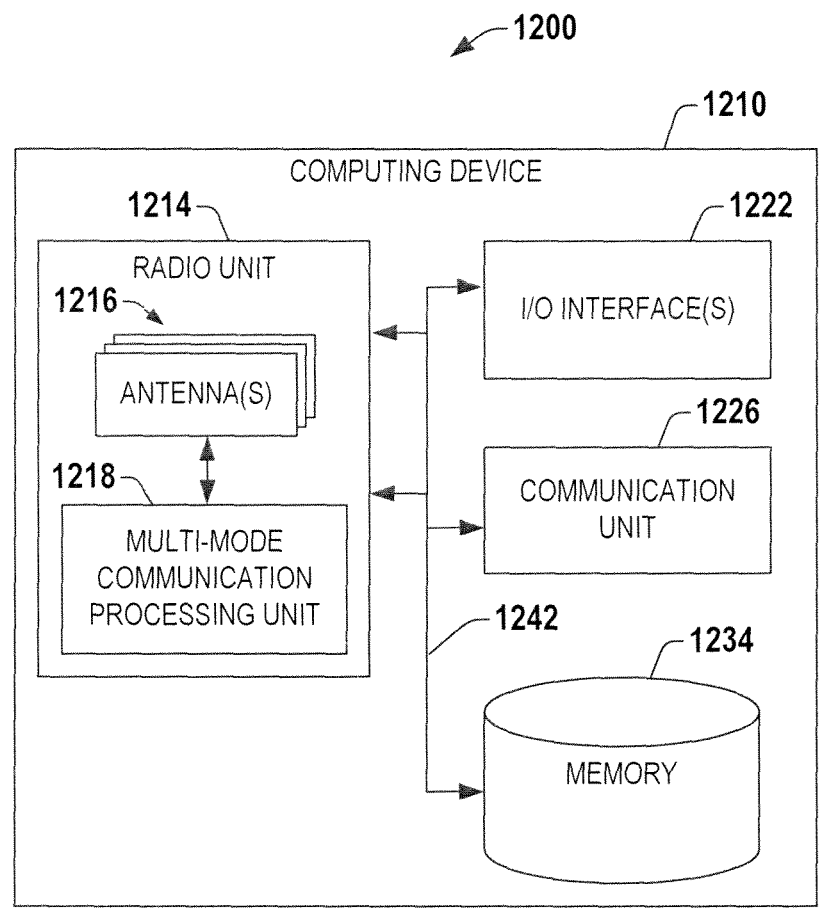
FIG. 12 depicts an example of a communication device in accordance with one or more embodiments of the disclosure.

FIG. 12 illustrates a block-diagram of an example embodiment 1200 of a computing device 1210 that can operate in accordance with at least certain aspects of the disclosure. In one aspect, the computing device 1210 can operate as a wireless device and can embody or can comprise an access point (e.g., access point 140), a mobile computing device (e.g., a user device 120 and/or user equipment or station), or other types of communication device that can transmit and/or receive wireless communications in accordance with this disclosure. To permit wireless communication, including the estimations of CFOs as described herein, the computing device 1210 includes a radio unit 1214 and a communication unit 1226. In certain implementations, the communication unit 1226 can generate packets or other types of information blocks via a network stack, for example, and can convey the packets or other types of information block to the radio unit 1214 for wireless communication. In one embodiment, the network stack (not shown) can be embodied in or can constitute a library or other types of programming module, and the communication unit 1226 can execute the network stack in order to generate a packet or other types of information block. Generation of the packet or the information block can include, for example, generation of control information (e.g., checksum data, communication address(es)), traffic information (e.g., payload data), LTF symbols, and/or formatting of such information into a specific packet header.

Figure 13:
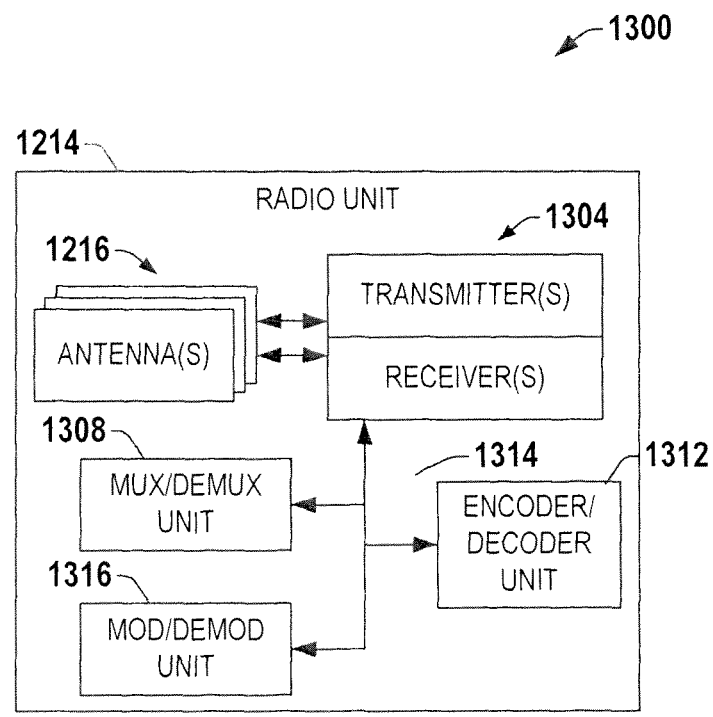
FIG. 13 depicts an example of a radio unit in accordance with one or more embodiments of the disclosure.

As illustrated, the radio unit 1214 can include one or more antennas 1216 and a multi-mode communication processing unit 1218. In certain embodiments, the antenna(s) 1216 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 1216 can be physically separated to leverage spatial diversity and related different channel characteristics associated with such diversity. In addition or in other embodiments, the multi-mode communication processing unit 1218 that can process at least wireless signals in accordance with one or more radio technology protocols and/or modes (such as MIMO, single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include 3GPP UMTS; LTE; LTE-A; Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 1218 also can process non-wireless signals (analogic, digital, a combination thereof, or the like). In one embodiment, e.g., example embodiment 1300 shown in FIG. 13, the multi-mode communication processing unit 1218 can comprise a set of one or more transmitters/receivers 1304, and components therein (amplifiers, filters, analog-to-digital (A/D) converters, etc.), functionally coupled to a multiplexer/demultiplexer (mux/demux) unit 1308, a modulator/demodulator (mod/demod) unit 1316 (also referred to as modem 1316), and an encoder/decoder unit 1312 (also referred to as codec 1312). Each of the transmitter(s)/receiver(s) can form respective transceiver(s) that can transmit and receive wireless signal (e.g., streams, electromagnetic radiation) via the one or more antennas 1216. It should be appreciated that in other embodiments, the multi-mode communication processing unit 1218 can include other functional elements, such as one or more sensors, a sensor hub, an offload engine or unit, a combination thereof, or the like.

Electronic components and associated circuitry, such as mux/demux unit 1308, codec 1312, and modem 1316 can permit or facilitate processing and manipulation, e.g., coding/decoding, deciphering, and/or modulation/demodulation, of signal(s) received by the computing device 1210 and signal(s) to be transmitted by the computing device 1210. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 1304, can exchange information (e.g., streams, LTF symbols, data, metadata, code instructions, signaling and related payload data, combinations thereof, or the like) through a bus 1314, which can embody or can comprise at least one of a system bus, an address bus, a data bus, a message bus, a reference link or interface, a combination thereof, or the like. Each of the one or more receivers/transmitters 1304 can convert signal from analog to digital and vice versa. In addition or in the alternative, the receiver(s)/transmitter(s) 1304 can divide a single data stream into multiple parallel data streams, or perform the reciprocal operation. Such operations may be conducted as part of various multiplexing schemes. As illustrated, the mux/demux unit 1308 is functionally coupled to the one or more receivers/transmitters 1304 and can permit processing of signals in time and frequency domain. In one aspect, the mux/demux unit 1308 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 1308 can scramble and spread information (e.g., codes) according to most any code, such as Hadamard-Walsh codes, Baker codes, Kasami codes, polyphase codes, and the like. The modem 1316 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that can be included in the computing device 1210 (e.g., processor(s) included in the radio unit 1214 or other functional element(s) of the computing device 1210) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 1312 can operate on information (e.g., data, metadata, signaling, or a combination thereof) in accordance with one or more coding/decoding schemes suitable for communication, at least in part, through the one or more transceivers formed from respective transmitter(s)/receiver(s) 1304. In one aspect, such coding/decoding schemes, or related procedure(s), can be retained as a group of one or more computer-accessible instructions (computer-readable instructions, computer-executable instructions, or a combination thereof) in one or more memory devices 1234 (referred to as memory 1234). In a scenario in which wireless communication among the computing device 1210 and another computing device (e.g., an access point 140, a user device 120, a station and/or other types of user equipment) utilizes MU-MIMI, MIMO, MISO, SIMO, or SISO operation, the codec 1312 can implement at least one of space-time block coding (STBC) and associated decoding, or space-frequency block (SFBC) coding and associated decoding. In addition or in the alternative, the codec 1312 can extract information from data streams coded in accordance with spatial multiplexing scheme. In one aspect, to decode received information (e.g., data, metadata, signaling, or a combination thereof), the codec 1312 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 1312 can utilize, at least in part, mux/demux component 1308 and mod/demod component 1316 to operate in accordance with aspects described herein.

The computing device 1210 can operate in a variety of wireless environments having wireless signals conveyed in different electromagnetic radiation (EM) frequency bands and/or subbands. To at least such end, the multi-mode communication processing unit 1218 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

The computing device 1210 can receive and/or transmit information encoded and/or modulated or otherwise processed in accordance with aspects of the present disclosure. To at least such an end, in certain embodiments, the computing device 1210 can acquire or otherwise access information, wirelessly via the radio unit 1214 (also referred to as radio 1214), where at least a portion of such information can be encoded and/or modulated in accordance with aspects described herein. More specifically, for example, the information can include packets (e.g., encoded LTF symbol sequences) in accordance with embodiments of the disclosure, such as those shown in FIGS. 1B-10.

The memory 1234 can contain one or more memory elements having information suitable for processing information received according to a predetermined communication protocol (e.g., IEEE 802.11ac or IEEE 802.11ax). While not shown, in certain embodiments, one or more memory elements of the memory 1234 can include computer-accessible instructions that can be executed by one or more of the functional elements of the computing device 1210 in order to implement at least some of the functionality for auto-detection described herein, including processing of information communicated (e.g., encoded, modulated, and/or arranged) in accordance with aspect of the disclosure. One or more groups of such computer-accessible instructions can embody or can constitute a programming interface that can permit communication of information (e.g., data, metadata, and/or signaling) between functional elements of the computing device 1210 for implementation of such functionality.

In addition, in the illustrated computing device 1200, a bus architecture 1242 (also referred to as bus 1242) can permit the exchange of information (e.g., data, metadata, and/or signaling) between two or more of (i) the radio unit 1214 or a functional element therein, (ii) at least one of the I/O interface(s) 1222, (iii) the communication unit 1226, or (iv) the memory 1234. In addition, one or more application programming interfaces (APIs) (not depicted in FIG. 12) or other types of programming interfaces that can permit exchange of information (e.g., streams, LTF symbols, data and/or metadata) between two or more of the functional elements of the client device 1210. At least one of such API(s) can be retained or otherwise stored in the memory 1234. In certain embodiments, it should be appreciated that at least one of the API(s) or other programming interfaces can permit the exchange of information within components of the communication unit 1226. The bus 1242 also can permit a similar exchange of information.

Figure 14:
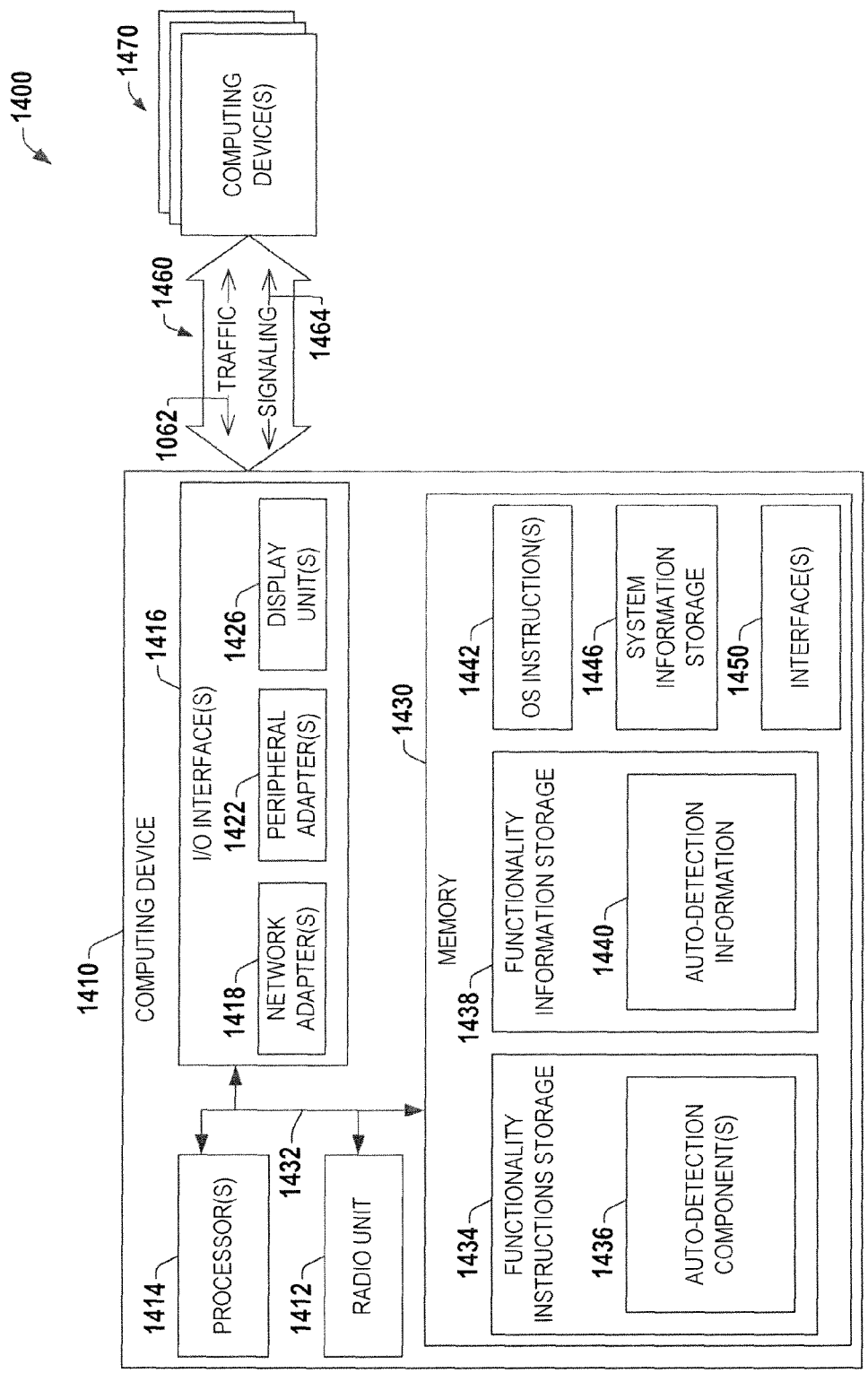
FIG. 14 depicts an example of a computational environment in accordance with one or more embodiments of the disclosure.

FIG. 14 illustrates an example of a computational environment 1400 for auto-detection in accordance with one or more aspects of the disclosure. The example computational environment 1400 is only illustrative and is not intended to suggest or otherwise convey any limitation as to the scope of use or functionality of such computational environments' architecture. In addition, the computational environment 1400 should not be interpreted as having any dependency or requirement relating to any one or combination of components illustrated in this example computational environment. The illustrative computational environment 1400 can embody or can include, for example, the computing device 1410, an access point 140, a user device 120, and/or any other computing device that can implement or otherwise leverage the auto-detection features described herein.

The computational environment 1400 represents an example of a software implementation of the various aspects or features of the disclosure in which the processing or execution of operations described in connection with auto-detection described herein, including processing of information communicated (e.g., encoded, modulated, and/or arranged) in accordance with this disclosure, can be performed in response to execution of one or more software components at the computing device 1410. It should be appreciated that the one or more software components can render the computing device 1410, or any other computing device that contains such components, a particular machine for auto-detection described herein, including processing of information encoded, modulated, and/or arranged in accordance with aspects described herein, among other functional purposes. A software component can be embodied in or can comprise one or more computer-accessible instructions, e.g., computer-readable and/or computer-executable instructions. At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 1410 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1410 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with auto-detection, including processing of information communicated (e.g., encoded, modulated, and/or arranged) in accordance with features described herein, can comprise personal computers; server computers; laptop devices; handheld computing devices, such as mobile tablets; wearable computing devices; and multiprocessor systems. Additional examples can include set top boxes, programmable consumer electronics, network PCs, mini-computers, mainframe computers, blade computers, programmable logic controllers, distributed computing environments that comprise any of the above systems or devices, and the like.

As illustrated, the computing device 1410 can comprise one or more processors 1414, one or more input/output (I/O) interfaces 1416, a memory 1430, and a bus architecture 1432 (also termed bus 1432) that functionally couples various functional elements of the computing device 1410. The bus 1432 can include at least one of a system bus, a memory bus, an address bus, or a message bus, and can permit exchange of information (data, metadata, and/or signaling) between the processor(s) 1414, the I/O interface(s) 1416, and/or the memory 1430, or respective functional element therein. In certain scenarios, the bus 1432 in conjunction with one or more internal programming interfaces 1450 (also referred to as interface(s) 1450) can permit such exchange of information. In scenarios in which processor(s) 1414 include multiple processors, the computing device 1410 can utilize parallel computing.

The I/O interface(s) 1416 can permit or otherwise facilitate communication of information between the computing device and an external device, such as another computing device, e.g., a network element or an end-user device. Such communication can include direct communication or indirect communication, such as exchange of information between the computing device 1410 and the external device via a network or elements thereof. As illustrated, the I/O interface(s) 1416 can comprise one or more of network adapter(s) 1418, peripheral adapter(s) 1422, and display unit(s) 1426. Such adapter(s) can permit or facilitate connectivity between the external device and one or more of the processor(s) 1414 or the memory 1430. In one aspect, at least one of the network adapter(s) 1418 can couple functionally the computing device 1410 to one or more computing devices 1470 via one or more traffic and signaling pipes 1460 that can permit or facilitate exchange of traffic 1462 and signaling 1464 between the computing device 1410 and the one or more computing devices 1470. Such network coupling provided at least in part by the at least one of the network adapter(s) 1418 can be implemented in a wired environment, a wireless environment, or both. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each access point 140, user device 120, station, and/or other device can have substantially the same architecture as the computing device 1410. In addition or in the alternative, the display unit(s) 1426 can include functional elements (e.g., lights, such as light-emitting diodes; a display, such as liquid crystal display (LCD), combinations thereof, or the like) that can permit control of the operation of the computing device 1410, or can permit conveying or revealing operational conditions of the computing device 1410.

In one aspect, the bus 1432 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 1432, and all buses described herein can be implemented over a wired or wireless network connection and each of the subsystems, including the processor(s) 1414, the memory 1430 and memory elements therein, and the I/O interface(s) 1416 can be contained within one or more remote computing devices 1470 at physically separate locations, connected through buses of this form, in effect implementing a fully distributed system.

The computing device 1410 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1410, and can comprise, for example, both volatile and non-volatile media, and removable and/or non-removable media. In one aspect, the memory 1430 can comprise computer-readable media in the form of volatile memory, such as random access memory (RAM), and/or non-volatile memory, such as read only memory (ROM).

The memory 1430 can comprise functionality instructions storage 1434 and functionality information storage 1438. The functionality instructions storage 1434 can comprise computer-accessible instructions that, in response to execution (by at least one of the processor(s) 1414), can implement one or more of the functionalities of the disclosure. The computer-accessible instructions can embody or can comprise one or more software components illustrated as auto-detection component(s) 1436. In one scenario, execution of at least one component of the auto-detection component(s) 1436 can implement one or more of the techniques disclosed herein. For instance, such execution can cause a processor that executes the at least one component to carry out a disclosed example method. It should be appreciated that, in one aspect, a processor of the processor(s) 1414 that executes at least one of the auto-detection component(s) 1436 can retrieve information from or retain information in a memory element 1440 in the functionality information storage 1438 in order to operate in accordance with the functionality programmed or otherwise configured by the auto-detection component(s) 1436. Such information can include at least one of code instructions, information structures, or the like. At least one of the one or more interfaces 1450 (e.g., application programming interface(s)) can permit or facilitate communication of information between two or more components within the functionality instructions storage 1434. The information that is communicated by the at least one interface can result from implementation of one or more operations in a method of the disclosure. In certain embodiments, one or more of the functionality instructions storage 1434 and the functionality information storage 1438 can be embodied in or can comprise removable/non-removable, and/or volatile/non-volatile computer storage media.

At least a portion of at least one of the auto-detection component(s) 1436 or auto-detection information 1440 can program or otherwise configure one or more of the processors 1414 to operate at least in accordance with the functionality described herein. One or more of the processor(s) 1414 can execute at least one of such components and leverage at least a portion of the information in the storage 1438 in order to provide auto-detection in accordance with one or more aspects described herein. More specifically, yet not exclusively, execution of one or more of the component(s) 1436 can permit transmitting and/or receiving information at the computing device 1410, where the at least a portion of the information includes one or more LTF symbols and/or streams of data as described in connection with FIGS. 1A-11, for example.

It should be appreciated that, in certain scenarios, the functionality instruction(s) storage 1434 can embody or can comprise a computer-readable non-transitory storage medium having computer-accessible instructions that, in response to execution, cause at least one processor (e.g., one or more of processor(s) 1414) to perform a group of operations comprising the operations or blocks described in connection with the disclosed methods.

In addition, the memory 1430 can comprise computer-accessible instructions and information (e.g., data and/or metadata) that permit or facilitate operation and/or administration (e.g., upgrades, software installation, any other configuration, or the like) of the computing device 1410. Accordingly, as illustrated, the memory 1430 can comprise a memory element 1442 (labeled OS instruction(s) 1442) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 1410 can dictate a suitable OS. The memory 1430 also comprises a system information storage 1446 having data and/or metadata that permits or facilitate operation and/or administration of the computing device 1410. Elements of the OS instruction(s) 1442 and the system information storage 1446 can be accessible or can be operated on by at least one of the processor(s) 1414.

It should be recognized that while the functionality instructions storage 1434 and other executable program components, such as the operating system instruction(s) 1442, are illustrated herein as discrete blocks, such software components can reside at various times in different memory components of the computing device 1410, and can be executed by at least one of the processor(s) 1414. In certain scenarios, an implementation of the auto-detection component(s) 1436 can be retained on or transmitted across some form of computer readable media.

The computing device 1410 and/or one of the computing device(s) 1470 can include a power supply (not shown), which can power up components or functional elements within such devices. The power supply can be a rechargeable power supply, e.g., a rechargeable battery, and it can include one or more transformers to achieve a power level suitable for operation of the computing device 1410 and/or one of the computing device(s) 1470, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 1418) to connect operationally to the conventional power grid. In another aspect, the power supply can include an energy conversion component, such as a solar panel, to provide additional or alternative power resources or autonomy for the computing device 1410 and/or one of the computing device(s) 1470.

The computing device 1410 can operate in a networked environment by utilizing connections to one or more remote computing devices 1470. As an illustration, a remote computing device can be a personal computer, a portable computer, a server, a router, a network computer, a peer device or other common network node, and so on. As described herein, connections (physical and/or logical) between the computing device 1410 and a computing device of the one or more remote computing devices 1470 can be made via one or more traffic and signaling pipes 1460, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

Figure 15:
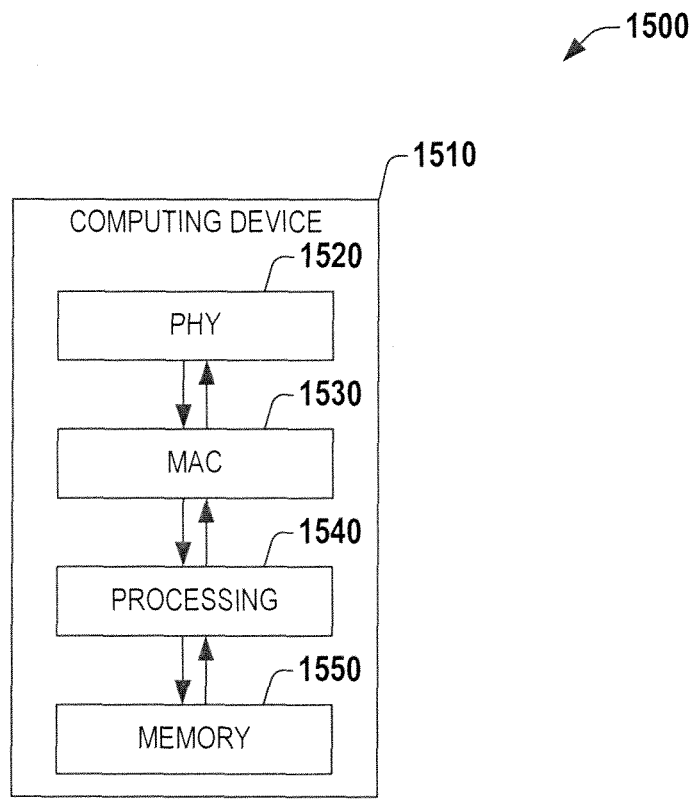
FIG. 15 depicts another example of a communication device in accordance with one or more embodiments of the disclosure.

FIG. 15 presents another example embodiment 1500 of a computing device 1510 in accordance with one or more embodiments of the disclosure. In certain implementations, the computing device 1510 can be a HEW-compliant device that may be configured to communicate with one or more other HEW devices and/or other types of communication devices, such as legacy communication devices. HEW devices and legacy devices also may be referred to as HEW stations (STAs) and legacy STAs, respectively. In one implementation, the computing device 1510 can operate as an access point 140, a user device 120, and/or another device. As illustrated, the computing device 1110 can include, among other things, physical layer (PHY) circuitry 1520 and medium-access-control layer (MAC) circuitry 1530. In one aspect, the PHY circuitry 1510 and the MAC circuitry 1530 can be HEW compliant layers and also can be compliant with one or more legacy IEEE 802.11 standards. In one aspect, the MAC circuitry 1530 can be arranged to configure physical layer converge protocol (PLCP) protocol data units (PPDUs) and arranged to transmit and receive PPDUs, among other things. In addition or in other embodiments, the computing device 1510 also can include other hardware processing circuitry 1540 (e.g., one or more processors) and one or more memory devices 1550 configured to perform the various operations described herein.

In certain embodiments, the MAC circuitry 1530 can be arranged to contend for a wireless medium during a contention period to receive control of the medium for the HEW control period and configure an HEW PPDU. In addition or in other embodiments, the PHY 1520 can be arranged to transmit the HEW PPDU. The PHY circuitry 1520 can include circuitry for modulation/demodulation, upconversion/downconversion, filtering, amplification, etc. As such, the computing device 1510 can include a transceiver to transmit and receive data such as HEW PPDU. In certain embodiments, the hardware processing circuitry 1140 can include one or more processors. The hardware processing circuitry 1540 can be configured to perform functions based on instructions being stored in a memory device (e.g., RAM or ROM) or based on special purpose circuitry. In certain embodiments, the hardware processing circuitry 1540 can be configured to perform one or more of the functions described herein, such as allocating bandwidth or receiving allocations of bandwidth.

In certain embodiments, one or more antennas may be coupled to or included in the PHY circuitry 1520. The antenna(s) can transmit and receive wireless signals, including transmission of HEW packets. As described herein, the one or more antennas can include one or more directional or omnidirectional antennas, including dipole antennas, monopole antennas, patch antennas, loop antennas, microstrip antennas or other types of antennas suitable for transmission of RF signals. In scenarios in which MIMO communication is utilized, the antennas may be physically separated to leverage spatial diversity and the different channel characteristics that may result.

The memory 1550 can retain or otherwise store information for configuring the other circuitry to perform operations for configuring and transmitting HEW packets and performing the various operations described herein including the allocation of and using of bandwidth (AP) and using the allocation of the bandwidth (STA).

The computing device 1510 can be configured to communicate using OFDM communication signals over a multicarrier communication channel. More specifically, in certain embodiments, the computing device 1510 can be configured to communicate in accordance with one or more specific radio technology protocols, such as the IEEE family of standards including IEEE 802.11-2012, IEEE 802.11n-2009, IEEE 802.11ac-2013, IEEE 802.11ax, DensiFi, and/or proposed specifications for WLANs. In one of such embodiments, the computing device 1510 can utilize or otherwise rely on symbols having a duration that is four times the symbol duration of IEEE 802.11n and/or IEEE 802.11ac. It should be appreciated that the disclosure is not limited in this respect and, in certain embodiments, the computing device 1510 also can transmit and/or receive wireless communications in accordance with other protocols and/or standards.

The computing device 1510 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other types of communication device that may receive and/or transmit information wirelessly. Similarly to the computing device 1410, the computing device 1510 can include, for example, one or more of a keyboard, a display, a non-volatile memory port, multiple antennas, a graphics processor, an application processor, speakers, and other mobile device elements. The display may be an LCD screen including a touch screen.

It should be appreciated that while the computing device 1510 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors.

In some embodiments, a wireless communication device is provided. The wireless communication device comprises: at least one memory comprising computer-executable instructions stored thereon; and one or more processing elements to execute the computer-executable instructions to: cause to receive one or more streams comprising one or more encoded long training field (LTF) symbols over the wireless communication channel; determine a first phase of the wireless communication channel upon receipt of a first LTF symbol; determine a second phase of the wireless communication channel upon receipt of a second LTF symbol; determine a phase difference between the first phase and the second phase; determine a carrier frequency offset (CFO) of the wireless communication channel using the determined phase difference; and modify the wireless communication channel based at least in part on the determined CFO.

In some embodiments, the first phase is determined at a first time-stamp and the second phase is determined at a second time-stamp after the first time-stamp.

In some embodiments, the first LTF symbol is a first LTF symbol in a sequence of LTF symbols comprised in the one or more streams, and wherein the second LTF symbol is a last LTF symbol in a second sequence of LTF symbols comprised in the one or more streams.

In some embodiments, the one or more processing elements are further configured to execute computer-executable instructions to: determine a number of LTF symbols comprised in the one or more streams based on a number of streams determined to be comprised in the wireless communication channel.

In some embodiments, the wireless communication channel comprises one or more subbands, and wherein each subband is configured to transmit one or more streams comprising the determined number of LTF symbols.

In some embodiments, the one or more processing elements are further configured to execute computer-executable instructions to: encode the one or more streams with the one or more LTF symbols using an orthogonal matrix, wherein the dimensions of the orthogonal matrix are defined by a number of streams comprised in the one or more streams and a number of LTF symbols comprised in the one or more LTF symbols; decode the one or more streams using the orthogonal matrix; and extract the one or more LTF symbols from the one or more streams.

In some embodiments, the one or more processing elements are further configured to execute computer-executable instructions to: determine a number of streams comprised in the one or more streams; determine a number of LTF symbols comprised in the one or more LTF symbols; determine the number of streams comprised in the one or more streams is less than the number of LTF symbols comprised in the one or more LTF symbols; and add one or more additional LTF symbols to the one or more LTF symbols to be encoded in the one or more streams so that a total number of LTF symbols encoded in the one or more streams is equal to the determined number of streams comprised in the one or more streams, wherein the total number of LTF symbols comprises a first decodable set of LTF symbols and a second decodable set of LTF symbols.

In some embodiments, a non-transitory computer readable storage device including instructions stored thereon is provided. When executed by one or more processor(s) of a wireless communication device, the instructions cause the wireless communication device to perform operations of: identifying one or more streams comprising one or more encoded long training field (LTF) symbols over the wireless communication channel; determining a first phase of the wireless communication channel upon receipt of a first LTF symbol; determining a second phase of the wireless communication channel upon receipt of a second LTF symbol; determining a phase difference between the first phase and the second phase; determining a carrier frequency offset (CFO) of the wireless communication channel using the determined phase difference; and modifying the wireless communication channel based at least in part on the determined CFO.

In some embodiments, the first phase is determined at a first time-stamp and the second phase is determined at a second time-stamp after the first time-stamp.

In some embodiments, the first LTF symbol is a first LTF symbol in a sequence of LTF symbols comprised in the one or more streams, and wherein the second LTF symbol is a last LTF symbol in a second sequence of LTF symbols comprised in the one or more streams.

In some embodiments, the non-transitory computer readable storage device further includes instructions stored thereon, which when executed by one or more processor(s) of a wireless communication device, cause the wireless communication device to perform operations of: determining a number of LTF symbols comprised in the one or more streams based on a number of streams determined to be comprised in the wireless communication channel.

In some embodiments, the wireless communication channel comprises one or more subbands, and wherein each subband is configured to transmit one or more streams comprising the determined number of LTF symbols.

In some embodiments, the non-transitory computer readable storage device further includes instructions stored thereon, which when executed by one or more processor(s) of a wireless communication device, cause the wireless communication device to perform operations of: encoding the one or more streams with the one or more LTF symbols using an orthogonal matrix, wherein the dimensions of the orthogonal matrix are defined by a number of streams comprised in the one or more streams and a number of LTF symbols comprised in the one or more LTF symbols; decoding the one or more streams using the orthogonal matrix; and extracting the one or more LTF symbols from the one or more streams.

In some embodiments, the encoding further comprises: determining a number of streams comprised in the one or more streams; determining a number of LTF symbols comprised in the one or more LTF symbols; determining the number of streams comprised in the one or more streams is less than the number of LTF symbols comprised in the one or more LTF symbols; and adding one or more additional LTF symbols to the one or more LTF symbols to be encoded in the one or more streams so that a total number of LTF symbols encoded in the one or more streams is equal to the determined number of streams comprised in the one or more streams, wherein the total number of LTF symbols comprises a first decodable set of LTF symbols and a second decodable set of LTF symbols.

In some embodiments, a method for determining a carrier frequency offset (CFO) of a wireless communication channel is provided. The method comprises: causing a wireless communication device to receive one or more streams comprising one or more encoded long training field (LTF) symbols over the wireless communication channel; determining, by the wireless communication device, a first phase of the wireless communication channel upon receipt of a first LTF symbol; determining, by the wireless communication device, a second phase of the wireless communication channel upon receipt of a second LTF symbol; determining, by the wireless communication device, a phase difference between the first phase and the second phase; determining, by the wireless communication device, a CFO of the wireless communication channel using the determined phase difference; and modifying, by the wireless communication device, the wireless communication channel based at least in part on the determined CFO.

In some embodiments, the first phase is determined at a first time-stamp and the second phase is determined at a second time-stamp after the first time-stamp.

In some embodiments, the first LTF symbol is a first LTF symbol in a sequence of LTF symbols comprised in the one or more streams, and wherein the second LTF symbol is a last LTF symbol in a second sequence of LTF symbols comprised in the one or more streams.

In some embodiments, the method further comprises: determining, by the wireless communication device, a number of LTF symbols comprised in the one or more streams based on a number of streams determined to be comprised in the wireless communication channel.

In some embodiments, the wireless communication channel comprises one or more subbands, and wherein each subband is configured to transmit one or more streams comprising the determined number of LTF symbols.

In some embodiments, the method further comprises: encoding, by the wireless communication device, the one or more streams with the one or more LTF symbols using an orthogonal matrix, wherein the dimensions of the orthogonal matrix are defined by a number of streams comprised in the one or more streams and a number of LTF symbols comprised in the one or more LTF symbols; decoding, by the wireless communication device, the one or more streams using the orthogonal matrix; and extracting, by the wireless communication device, the one or more LTF symbols from the one or more streams.

In some embodiments, the encoding further comprises: determining, by the wireless communication device, a number of streams comprised in the one or more streams; determining, by the wireless communication device, a number of LTF symbols comprised in the one or more LTF symbols; determining, by the wireless communication device, the number of streams comprised in the one or more streams is less than the number of LTF symbols comprised in the one or more LTF symbols; and adding one or more additional LTF symbols to the one or more LTF symbols to be encoded in the one or more streams so that a total number of LTF symbols encoded in the one or more streams is equal to the determined number of streams comprised in the one or more streams, wherein the total number of LTF symbols comprises a first decodable set of LTF symbols and a second decodable set of LTF symbols, wherein one or more additional LTF symbols are added to the first decodable set using an orthogonal matrix of a first size and one or more additional LTF symbols are added to the second decodable set using an orthogonal matrix of a second size different from the first size.

In some embodiments, a system for determining a carrier frequency offset (CFO) of a wireless communication channel is provided. The system comprises: an access point comprising an antenna; one or more user devices comprising an antenna and communicatively coupled to the access point via the wireless communication channel; and wherein the access point is configured to: cause to receive a stream comprising one or more encoded long training field (LTF) symbols via the wireless communication channel; decode the one or more LTF symbols encoded in the stream to thereby extract the one or more LTF symbols from the stream; determine a first phase of the wireless communication channel upon receipt of a first LTF symbol; determine a second phase of the wireless communication channel upon receipt of a second LTF symbol; calculate a phase difference between the first and second phases of the wireless communication channel; determine a CFO of the wireless communication channel using the phase difference between the first and second phases of the wireless communication channel; and modify the wireless communication channel based at least in part on the determined CFO.

In some embodiments, modifying the wireless communication channel comprises adjusting one or more characteristics associated with the wireless communication channel. For example, the wireless channel may adjust one or more bands, subbands, subchannels, and/or the like of the wireless communication channel. Additionally, the wireless channel may adjust one or more frequencies, carrier frequencies, time of operation and/or the like. Any of the operations described herein may be included as a modification of the wireless channel.

In some embodiments, a device is provided. The device comprises: at least one memory comprising computer-executable instructions stored thereon; and one or more processing elements to execute the computer-executable instructions to: encode one or more long training field (LTF) symbols into one or more streams of a wireless communication channel; transmit, to a second device, the one or more streams comprising one or more encoded LTF symbols over the wireless communication channel.

In some embodiments, the second device is configured to: decode the one or more streams to extract the one or more encoded LTF symbols from the one or more streams; determine a first phase of the wireless communication channel upon receipt of a first LTF symbol; determine a second phase of the wireless communication channel upon receipt of a second LTF symbol; calculate a phase difference between the first and second phases of the wireless communication channel; and determine a carrier frequency offset (CFO) of the wireless communication channel using the phase difference between the first and second phases of the wireless communication channel.

In some embodiments, the one or more LTF symbols are encoded into the one or more streams using an orthogonal matrix, wherein the dimensions of the orthogonal matrix are defined by a number of streams comprised in the one or more streams and a number of LTF symbols comprised in the one or more LTF symbols, and wherein the same orthogonal matrix is used by the second device to decode the one or more streams.

In some embodiments, encoding the one or more LTF symbols into the one or more streams comprises: determining a number of streams comprised in the one or more streams; determining a number of LTF symbols comprised in the one or more LTF symbols; determining the number of streams comprised in the one or more streams is less than the number of LTF symbols comprised in the one or more LTF symbols; and adding one or more additional LTF symbols to the one or more LTF symbols to be encoded in the one or more streams so that a total number of LTF symbols encoded in the one or more streams is equal to the determined number of streams comprised in the one or more streams, wherein the total number of LTF symbols comprises a first decodable set of LTF symbols and a second decodable set of LTF symbols, wherein one or more additional LTF symbols are added to the first decodable set using an orthogonal matrix of a first size and one or more additional LTF symbols are added to the second decodable set using an orthogonal matrix of a second size different from the first size.

In some embodiments, the one or more processing elements are further configured to execute computer-executable instructions to: modify the wireless communication channel based at least in part on the determined CFO.

In some embodiments, the wireless communication device is further configured to: determine a number of LTF symbols comprised in the one or more streams based on a number of streams determined to be comprised in the wireless communication channel.

In some embodiments, the wireless communication channel comprises one or more subbands, and wherein each subband is configured to transmit one or more streams comprising the determined number of LTF symbols.

In some embodiments, the first phase is determined at a first time-stamp and the second phase is determined at a second time-stamp after the first time-stamp.

In some embodiments, the first LTF symbol is a first LTF symbol in a sequence of LTF symbols comprised in the one or more streams, and wherein the second LTF symbol is a last LTF symbol in a second sequence of LTF symbols comprised in the one or more streams.

In some embodiments, an apparatus is provided. The apparatus comprises: means for identifying one or more streams comprising one or more encoded long training field (LTF) symbols over the wireless communication channel; means for determining a first phase of the wireless communication channel upon receipt of a first LTF symbol; means for determining a second phase of the wireless communication channel upon receipt of a second LTF symbol; means for determining a phase difference between the first phase and the second phase; means for determining a carrier frequency offset (CFO) of the wireless communication channel using the determined phase difference; and means for modifying the wireless communication channel based at least in part on the determined CFO.

In some embodiments, the first phase is determined at a first time-stamp and the second phase is determined at a second time-stamp after the first time-stamp.

In some embodiments, the first LTF symbol is a first LTF symbol in a sequence of LTF symbols comprised in the one or more streams, and wherein the second LTF symbol is a last LTF symbol in a second sequence of LTF symbols comprised in the one or more streams.

In some embodiments, the apparatus further comprises: means for determining a number of LTF symbols comprised in the one or more streams based on a number of streams determined to be comprised in the wireless communication channel.

In some embodiments, the wireless communication channel comprises one or more subbands, and wherein each subband is configured to transmit one or more streams comprising the determined number of LTF symbols.

In some embodiments, the apparatus further comprises: means for encoding the one or more streams with the one or more LTF symbols using an orthogonal matrix, wherein the dimensions of the orthogonal matrix are defined by a number of streams comprised in the one or more streams and a number of LTF symbols comprised in the one or more LTF symbols; means for decoding the one or more streams using the orthogonal matrix; and means for extracting the one or more LTF symbols from the one or more streams.

In some embodiments, the means for encoding further comprises: means for determining a number of streams comprised in the one or more streams; means for determining a number of LTF symbols comprised in the one or more LTF symbols; means for determining the number of streams comprised in the one or more streams is less than the number of LTF symbols comprised in the one or more LTF symbols; and means for adding one or more additional LTF symbols to the one or more LTF symbols to be encoded in the one or more streams so that a total number of LTF symbols encoded in the one or more streams is equal to the determined number of streams comprised in the one or more streams, wherein the total number of LTF symbols comprises a first decodable set of LTF symbols and a second decodable set of LTF symbols.

In some embodiments, an apparatus is provided. The apparatus comprises: means for encoding one or more long training field (LTF) symbols into one or more streams of a wireless communication channel; and means for transmitting, to a second apparatus, the one or more streams comprising one or more encoded LTF symbols over the wireless communication channel.

In some embodiments, the second apparatus comprises: means for decoding the one or more streams to extract the one or more encoded LTF symbols from the one or more streams; means for determining a first phase of the wireless communication channel upon receipt of a first LTF symbol; means for determining a second phase of the wireless communication channel upon receipt of a second LTF symbol; means for calculating a phase difference between the first and second phases of the wireless communication channel; and means for determining a carrier frequency offset (CFO) of the wireless communication channel using the phase difference between the first and second phases of the wireless communication channel.

In some embodiments, the one or more LTF symbols are encoded into the one or more streams using an orthogonal matrix, wherein the dimensions of the orthogonal matrix are defined by a number of streams comprised in the one or more streams and a number of LTF symbols comprised in the one or more LTF symbols, and wherein the same orthogonal matrix is used by the second device to decode the one or more streams.

In some embodiments, the means for encoding the one or more LTF symbols into the one or more streams comprises: means for determining a number of streams comprised in the one or more streams; means for determining a number of LTF symbols comprised in the one or more LTF symbols; means for determining the number of streams comprised in the one or more streams is less than the number of LTF symbols comprised in the one or more LTF symbols; and means for adding one or more additional LTF symbols to the one or more LTF symbols to be encoded in the one or more streams so that a total number of LTF symbols encoded in the one or more streams is equal to the determined number of streams comprised in the one or more streams, wherein the total number of LTF symbols comprises a first decodable set of LTF symbols and a second decodable set of LTF symbols, wherein one or more additional LTF symbols are added to the first decodable set using an orthogonal matrix of a first size and one or more additional LTF symbols are added to the second decodable set using an orthogonal matrix of a second size different from the first size.

In some embodiments, the apparatus further comprises: means for modifying the wireless communication channel based at least in part on the determined CFO.

In some embodiments, the apparatus comprises: means for determining a number of LTF symbols comprised in the one or more streams based on a number of streams determined to be comprised in the wireless communication channel.

In some embodiments, the wireless communication channel comprises one or more subbands, and wherein each subband is configured to transmit one or more streams comprising the determined number of LTF symbols.

In some embodiments, the first phase is determined at a first time-stamp and the second phase is determined at a second time-stamp after the first time-stamp.

In some embodiments, the first LTF symbol is a first LTF symbol in a sequence of LTF symbols comprised in the one or more streams, and wherein the second LTF symbol is a last LTF symbol in a second sequence of LTF symbols comprised in the one or more streams.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A wireless communication device comprising:
at least one memory comprising computer-executable instructions stored thereon; and one or more processing elements to execute the computer-executable instructions to:
cause to receive one or more streams comprising one or more encoded long training field (LTF) symbols over a wireless communication channel;
determine a number of streams comprised in the one or more streams;
determine a number of LTF symbols comprised in the one or more LTF symbols, wherein the number of streams is less than the number of LTF symbols;
determine a first phase of the wireless communication channel upon receipt of a first LTF symbol;

determine a second phase of the wireless communication channel upon receipt of a second LTF symbol;

determine a phase difference between the first phase and the second phase;

determine a carrier frequency offset (CFO) of the wireless communication channel using the determined phase difference; and modify the wireless communication channel based at least in part on the determined CFO; and determine one or more additional LTF symbols added to the one or more encoded LTF symbols, where a total number of LTF symbols encoded in the one or more streams is equal to the determined number of streams, wherein the total number of LTF symbols comprises a first decodable set of LTF symbols and a second decodable set of LTF symbols, wherein a first portion of the one or more additional LTF symbols are added to the first decodable set using a first orthogonal matrix of a first size and a second portion of the one or more additional LTF symbols are added to the second decodable set using a second orthogonal matrix of a second size different from the first size.

2. The device of claim 1, wherein the first phase is determined at a first time-stamp and the second phase is determined at a second time-stamp after the first time-stamp.

3. The device of claim 1, wherein the first LTF symbol is a first LTF symbol in a sequence of LTF symbols comprised in the one or more streams, and wherein the second LTF symbol is a last LTF symbol in a second sequence of LTF symbols comprised in the one or more streams.

4. The device of claim 1, wherein the one or more processing elements are further configured to execute computer-executable instructions to:

determine a number of LTF symbols comprised in the one or more streams based on a number of streams determined to be comprised in the wireless communication channel.

5. The device of claim 4, wherein the wireless communication channel comprises one or more subbands, and wherein each subband is configured to transmit one or more streams comprising the determined number of LTF symbols.

6. The device of claim 1, wherein the one or more processing elements are further configured to execute computer-executable instructions to:

encode the one or more streams with the one or more LTF symbols using an orthogonal matrix, wherein the dimensions of the orthogonal matrix are defined by a number of streams comprised in the one or more streams and a number of LTF symbols comprised in the one or more LTF symbols;

decode the one or more streams using the orthogonal matrix; and extract the one or more LTF symbols from the one or more streams.

7. The device of claim 6, wherein the one or more processing elements are further configured to execute computer-executable instructions to:

determine a number of streams comprised in the one or more streams;

determine a number of LTF symbols comprised in the one or more LTF symbols;

determine the number of streams comprised in the one or more streams is less than the number of LTF symbols comprised in the one or more LTF symbols; and add one or more additional LTF symbols to the one or more LTF symbols to be encoded in the one or more streams so that a total number of LTF symbols encoded in the one or more streams is equal to the determined number of streams comprised in the one or more streams, wherein the total number of LTF symbols comprises a first decodable set of LTF symbols and a second decodable set of LTF symbols.

8. A non-transitory computer readable storage device including instructions stored thereon, which when executed by one or more processor(s) of a wireless communication device, cause the wireless communication device to perform operations of:

identifying one or more streams comprising one or more encoded long training field (LTF) symbols over a wireless communication channel;

determining a number of streams comprised in the one or more streams;

determining a number of LTF symbols comprised in the one or more LTF symbols, wherein the number of streams is less than the number of LTF symbols;

determining a first phase of the wireless communication channel upon receipt of a first LTF symbol;

determining a second phase of the wireless communication channel upon receipt of a second LTF symbol;

determining a phase difference between the first phase and the second phase;

determining a carrier frequency offset (CFO) of the wireless communication channel using the determined phase difference; and modifying the wireless communication channel based at least in part on the determined CFO; and determining one or more additional LTF symbols added to the one or more encoded LTF symbols, where a total number of LTF symbols encoded in the one or more streams is equal to the determined number of streams, wherein the total number of LTF symbols comprises a first decodable set of LTF symbols and a second decodable set of LTF symbols, wherein a first portion of the one or more additional LTF symbols are added to the first decodable set using a first orthogonal matrix of a first size and a second portion of the one or more additional LTF symbols are added to the second decodable set using a second orthogonal matrix of a second size different from the first size.

9. The non-transitory computer readable storage device of claim 8, wherein the first phase is determined at a first time-stamp and the second phase is determined at a second time-stamp after the first time-stamp.

10. The non-transitory computer readable storage device of claim 8, wherein the first LTF symbol is a first LTF symbol in a sequence of LTF symbols comprised in the one or more streams, and wherein the second LTF symbol is a last LTF symbol in a second sequence of LTF symbols comprised in the one or more streams.

11. The non-transitory computer readable storage device of claim 8, wherein the non-transitory computer readable storage device further includes instructions stored thereon, which when executed by one or more processor(s) of a wireless communication device, cause the wireless communication device to perform operations of:

determining a number of LTF symbols comprised in the one or more streams based on a number of streams determined to be comprised in the wireless communication channel.

12. The non-transitory computer readable storage device of claim 11, wherein the wireless communication channel comprises one or more subbands, and wherein each subband is configured to transmit one or more streams comprising the determined number of LTF symbols.

13. The non-transitory computer readable storage device of claim 8, wherein the non-transitory computer readable storage device further includes instructions stored thereon, which when executed by one or more processor(s) of a wireless communication device, cause the wireless communication device to perform operations of:
 encoding the one or more streams with the one or more LTF symbols using an orthogonal matrix, wherein the dimensions of the orthogonal matrix are defined by a number of streams comprised in the one or more streams and a number of LTF symbols comprised in the one or more LTF symbols;
 decoding the one or more streams using the orthogonal matrix; and
 extracting the one or more LTF symbols from the one or more streams.

14. The non-transitory computer readable storage device of claim 13, wherein the encoding further comprises:
 determining a number of streams comprised in the one or more streams;
 determining a number of LTF symbols comprised in the one or more LTF symbols;
 determining the number of streams comprised in the one or more streams is less than the number of LTF symbols comprised in the one or more LTF symbols; and
 adding one or more additional LTF symbols to the one or more LTF symbols to be encoded in the one or more streams so that a total number of LTF symbols encoded in the one or more streams is equal to the determined number of streams comprised in the one or more streams, wherein the total number of LTF symbols comprises a first decodable set of LTF symbols and a second decodable set of LTF symbols.

15. A method for determining a carrier frequency offset (CFO) of a wireless communication channel, the method comprising:
 causing a wireless communication device to receive one or more streams comprising one or more encoded long training field (LTF) symbols over the wireless communication channel;
 determining a number of streams comprised in the one or more streams;
 determining a number of LTF symbols comprised in the one or more LTF symbols, wherein the number of streams is less than the number of LTF symbols;
 determining, by the wireless communication device, a first phase of the wireless communication channel upon receipt of a first LTF symbol;
 determining, by the wireless communication device, a second phase of the wireless communication channel upon receipt of a second LTF symbol;
 determining, by the wireless communication device, a phase difference between the first phase and the second phase;
 determining, by the wireless communication device, a CFO of the wireless communication channel using the determined phase difference; and
 modifying, by the wireless communication device, the wireless communication channel based at least in part on the determined CFO; and
 determining one or more additional LTF symbols added to the one or more encoded LTF symbols, where a total number of LTF symbols encoded in the one or more streams is equal to the determined number of streams, wherein the total number of LTF symbols comprises a first decodable set of LTF symbols and a second decodable set of LTF symbols, wherein a first portion of the one or more additional LTF symbols are added to the first decodable set using a first orthogonal matrix of a first size and a second portion of the one or more additional LTF symbols are added to the second decodable set using a second orthogonal matrix of a second size different from the first size.

16. The method of claim 15, wherein the first phase is determined at a first time-stamp and the second phase is determined at a second time-stamp after the first time-stamp.

17. The method of claim 15, wherein the first LTF symbol is a first LTF symbol in a sequence of LTF symbols comprised in the one or more streams, and wherein the second LTF symbol is a last LTF symbol in a second sequence of LTF symbols comprised in the one or more streams.

18. The method of claim 15, wherein the method further comprises:
 determining, by the wireless communication device, a number of LTF symbols comprised in the one or more streams based on a number of streams determined to be comprised in the wireless communication channel.

19. The method of claim 18, wherein the wireless communication channel comprises one or more subbands, and wherein each subband is configured to transmit one or more streams comprising the determined number of LTF symbols.

20. The method of claim 15, wherein the method further comprises:
 encoding, by the wireless communication device, the one or more streams with the one or more LTF symbols using an orthogonal matrix, wherein the dimensions of the orthogonal matrix are defined by a number of streams comprised in the one or more streams and a number of LTF symbols comprised in the one or more LTF symbols;
 decoding, by the wireless communication device, the one or more streams using the orthogonal matrix; and
 extracting, by the wireless communication device, the one or more LTF symbols from the one or more streams.

21. A system for determining a carrier frequency offset (CFO) of a wireless communication channel, the system comprising:
 an access point comprising an antenna;
 one or more user devices comprising an antenna and communicatively coupled to the access point via the wireless communication channel; and
 wherein the access point is configured to:
  cause to receive a stream comprising one or more encoded long training field (LTF) symbols via the wireless communication channel;
  determine a number of streams comprised in the one or more streams;
  determine a number of LTF symbols comprised in the one or more LTF symbols, wherein the number of streams is less than the number of LTF symbols;
  decode the one or more LTF symbols encoded in the stream to thereby extract the one or more LTF symbols from the stream;
  determine a first phase of the wireless communication channel upon receipt of a first LTF symbol;
  determine a second phase of the wireless communication channel upon receipt of a second LTF symbol;
  calculate a phase difference between the first and second phases of the wireless communication channel;

determine a CFO of the wireless communication channel using the phase difference between the first and second phases of the wireless communication channel; and modify the wireless communication channel based at least in part on the determined CFO; and determine one or more additional LTF symbols added to the one or more encoded LTF symbols, where a total number of LTF symbols encoded in the one or more streams is equal to the determined number of streams, wherein the total number of LTF symbols comprises a first decodable set of LTF symbols and a second decodable set of LTF symbols, wherein a first portion of the one or more additional LTF symbols are added to the first decodable set using a first orthogonal matrix of a first size and a second portion of the one or more additional LTF symbols are added to the second decodable set using a second orthogonal matrix of a second size different from the first size.

22. The system of claim 21, wherein modifying the wireless communication channel comprises adjusting one or more characteristics associated with the wireless communication channel.

23. A device, comprising:
at least one memory comprising computer-executable instructions stored thereon; and
one or more processing elements to execute the computer-executable instructions to:
determine a number of streams comprised in the one or more streams;
determine a number of LTF symbols comprised in the one or more LTF symbols;
determine the number of streams comprised in the one or more streams is less than the number of LTF symbols comprised in the one or more LTF symbols; and
add one or more additional LTF symbols to the one or more LTF symbols to be encoded in the one or more streams so that a total number of LTF symbols encoded in the one or more streams is equal to the determined number of streams comprised in the one or more streams, wherein the total number of LTF symbols comprises a first decodable set of LTF symbols and a second decodable set of LTF symbols, wherein one or more additional LTF symbols are added to the first decodable set using an orthogonal matrix of a first size and one or more additional LTF symbols are added to the second decodable set using an orthogonal matrix of a second size different from the first size;
encode one or more long training field (LTF) symbols into one or more streams of the wireless communication channel; and
transmit, to a second device, the one or more streams comprising one or more encoded LTF symbols over a wireless communication channel.

24. The device of claim 23, wherein the second device is configured to:
decode the one or more streams to extract the one or more encoded LTF symbols from the one or more streams;
determine a first phase of the wireless communication channel upon receipt of a first LTF symbol;
determine a second phase of the wireless communication channel upon receipt of a second LTF symbol;
calculate a phase difference between the first and second phases of the wireless communication channel; and
determine a carrier frequency offset (CFO) of the wireless communication channel using the phase difference between the first and second phases of the wireless communication channel.

25. The device of claim 24, wherein the one or more LTF symbols are encoded into the one or more streams using an orthogonal matrix, wherein the dimensions of the orthogonal matrix are defined by a number of streams comprised in the one or more streams and a number of LTF symbols comprised in the one or more LTF symbols, and wherein the same orthogonal matrix is used by the second device to decode the one or more streams.

26. The device of claim 24, wherein the one or more processing elements are further configured to execute computer-executable instructions to:
modify the wireless communication channel based at least in part on the determined CFO.

27. The device of claim 23, wherein the wireless communication device is further configured to:
determine a number of LTF symbols comprised in the one or more streams based on a number of streams determined to be comprised in the wireless communication channel.

28. The device of claim 27, wherein the wireless communication channel comprises one or more subbands, and wherein each subband is configured to transmit one or more streams comprising the determined number of LTF symbols.

29. The device of claim 24, wherein the first phase is determined at a first time-stamp and the second phase is determined at a second time-stamp after the first time-stamp.

30. The device of claim 24, wherein the first LTF symbol is a first LTF symbol in a sequence of LTF symbols comprised in the one or more streams, and wherein the second LTF symbol is a last LTF symbol in a second sequence of LTF symbols comprised in the one or more streams.

* * * * *